(12) United States Patent
Hiraide

(10) Patent No.: US 8,908,026 B2
(45) Date of Patent: Dec. 9, 2014

(54) IMAGING METHOD AND MICROSCOPE DEVICE

(75) Inventor: Shuzo Hiraide, Tokyo (JP)

(73) Assignee: Olympus Corporation, Tokyo (JP)

( * ) Notice: Subject to any disclaimer, the term of this patent is extended or adjusted under 35 U.S.C. 154(b) by 717 days.

(21) Appl. No.: 13/238,730

(22) Filed: Sep. 21, 2011

(65) Prior Publication Data

US 2012/0075455 A1    Mar. 29, 2012

(30) Foreign Application Priority Data

Sep. 27, 2010    (JP) .................................. 2010-215906

(51) Int. Cl.
  *H04N 7/18*    (2006.01)
  *G02B 21/24*    (2006.01)
  *G02B 21/36*    (2006.01)

(52) U.S. Cl.
  CPC ............ *G02B 21/365* (2013.01); *G02B 21/247* (2013.01)
  USPC ........................................................ 348/79

(58) Field of Classification Search
  CPC .............................. G02B 21/247; G02B 21/365
  USPC ............................................................ 348/79
  See application file for complete search history.

(56) References Cited

U.S. PATENT DOCUMENTS

| | | | | |
|---|---|---|---|---|
| 4,690,561 A | * | 9/1987 | Ito ............................... | 356/339 |
| 4,803,352 A | * | 2/1989 | Bierleutgeb ................. | 250/201.3 |
| 5,912,735 A | * | 6/1999 | Xu ............................... | 356/497 |
| 2002/0135692 A1 | * | 9/2002 | Fujinawa ...................... | 348/335 |
| 2004/0021791 A1 | * | 2/2004 | Nishina ........................ | 348/335 |
| 2007/0075216 A1 | * | 4/2007 | Tohma ......................... | 250/201.3 |
| 2007/0164194 A1 | * | 7/2007 | Kurata et al. ................ | 250/201.4 |

FOREIGN PATENT DOCUMENTS

JP    2008-209627 A    9/2008

OTHER PUBLICATIONS

Ietomi, K. et al "Experimental Evaluation of Color Image Estimation Method Using Multipoint Spectrum Measurements," 54th Meeting of JSAP and Related Societies, Spring 2007, p. 27a-Sb-6, Tokyo Institute of Technology, Imaging Science and Engineering Laboratory, Japan.

Murakami, Y. et al "Piecewise Wiener Estimation for Spectrum-Based Color Reproduction Using Multipoint Spectral Measurements," 55th Meeting of JSAP and Related Societies, Spring 2008, p. 27-a-ZB-6, Tokyo Institute of Technology, Imaging Science & Engineering Laboratory, Japan.

* cited by examiner

*Primary Examiner* — Sath V Perungavoor
*Assistant Examiner* — Peter D Le
(74) *Attorney, Agent, or Firm* — Westerman, Hattori, Daniels & Adrian, LLP

(57)    ABSTRACT

An imaging method may include a first step in which light from a test specimen is guided to an imaging unit, a second step in which light from the test specimen is guided to an autofocus unit, a third step in which the light guided to an autofocus unit is split, and is guided on a third optical path and a fourth optical path, a fourth step in which a focal point of the imaging unit is adjusted such that an image of the test specimen that is created by the light from the test specimen guided on the first optical path is formed on an imaging surface of the imaging unit, a fifth step in which an image of the test specimen is acquired and image data is created, a sixth step in which spectrum information for the test specimen is detected, and a seventh step in which a color tone of the image data is corrected.

7 Claims, 24 Drawing Sheets

IMAGING METHOD AND MICROSCOPE DEVICE

BACKGROUND OF THE INVENTION

1. Field of the Invention

The present invention relates to an imaging method and microscope device.

Priority is claimed on Japanese Patent Application No. 2010-215906, filed Sep. 27, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, virtual microscopes have become widely known in fields of pathology such as cell and tissue diagnosis. These microscopes take a color photograph of an entire sample on a glass slide on which a test specimen has been placed, and then convert this photograph into a digital image. This is then displayed on a monitor, and can be manipulated just as if the test specimen were being observed using an actual microscope. Moreover, because accurate diagnoses are required in medical images that are used for pathological cell and tissue diagnosis, there is a need for the color of the subject to be accurately reproduced.

One method which is known to improve the color reproducibility of a photographic image is a method in which, using RGB color image data for the subject and point-measured spectrum information (i.e., a point-measurement spectrum) for the subject, the estimation accuracy of the spectral reflectance of a 3-band RGB image is improved, so that the color reproducibility of a color image of the sample slide is improved (see, for example, "Experimental evaluation of color image estimation method using multipoint spectrum measurements" by Tokyo Institute of Technology, Imaging Science and Engineering Laboratory, K. Ietomi et al., Proceedings of the 54th Spring Meeting, JSAP and Related Societies, 2007 Spring, which is hereinafter referred as Nonpatent document 1, and "Piecewise Wiener estimation for spectrum-based color reproduction using multipoint spectral measurements" by Tokyo Institute of Technology, Imaging Science and Engineering Laboratory, Y. Murakami et al., Proceedings of the 55th Spring Meeting, JSAP and Related Societies, 2008 Spring, which is hereinafter referred as Nonpatent document 2). In addition, a method in which a spectrum detector such as a spectrometer is used is widely known as a method for acquiring a point-measurement spectrum.

FIG. 24 is a block diagram illustrating a structure of a microscope device which has been fitted with a spectrum detector in accordance with the related art. A microscope device 1400 shown in the drawing includes a stage 1402 on which a test specimen 1401 is placed, and with a stage drive unit 1403 that moves the stage 1402 in a horizontal direction and in the direction of the optical axis. The microscope device 1400 also includes a light source 1404 that illuminates the test specimen 1401, a condenser lens 1405 that condenses light from the light source 1404, an objective lens 1406 that is formed by a plurality of lenses in such a manner that it faces the test specimen 1401, a first imaging lens 1407 that is located on the optical axis of the objective lens 1406, and a camera 1408 that photographs an image of the test specimen 1401.

The microscope device 1400 also includes an AF unit 1409 that creates a focusing signal which is required to focus an image of the test specimen 1401 in the camera 1408, and with a spectrum detector 1410 that acquires spectrum information about a predetermined portion of the test specimen 1401. The microscope device 1400 also includes a beam splitter 1411 and a beam splitter 1412 that are located on the optical axis of the objective lens 1406 and that divide the light from the test specimen 1401 and guide it towards the AF unit 1409 and the spectrum detector 1410. The microscope device 1400 also includes a condenser lens 1413 that condenses light from the beam splitter 1411 and guides it towards the AF unit 1409. The microscope device also includes a condenser lens 1414 that condenses light from the beam splitter 1412 and guides it towards the spectrum detector 1410. The microscope device 1400 also includes an image processing section 1415 that, based on spectrum information detected by the spectrum detector 1409, corrects images acquired by the camera 1408.

Next, the method used by the microscope device 1400 to acquire images of the test specimen 1401 will be described. Firstly, the stage drive unit 1403 drives the stage 1402 in a horizontal direction, and moves a predetermined photograph area of the test specimen 1401 which has been placed on the stage 1402 to within the field of view of the camera 1408. Next, based on commands from the AF unit 1410, the stage drive unit 1403 moves the stage 1402 in the optical axis direction such that an image of the test specimen 1401 is formed on an image sensor surface of the camera 1408.

Next, after the image of the test specimen 1401 has been formed on the image sensor surface of the camera 1408, the camera 1408 acquires an image of a predetermined photograph area of the test specimen 1401, and the spectrum detector 1409 detects the spectrum of this predetermined area of the test specimen 1401. Next, based on the spectrum information detected by the spectrum detector 1409, the image processing section 1415 corrects the image acquired by the camera 1408 so that the color reproducibility of the acquired image of the test specimen 1401 is improved.

In this manner, a microscope device 1400 is known that splits light from the test specimen 1401 and guides the light to the camera 1408, the AF unit 1410, and the spectrum detector 1409 (see, for example, Japanese Unexamined Patent Application, First Publication No. 2008-209627).

The above described spectrum detector 1409 creates spectrum information that is used to improve the color reproducibility of the image of the test specimen 1401 that was acquired by the camera 1408 and, in order for the color of the image of the test specimen 1401 to be reproduced with a high degree of accuracy, it is necessary for a sufficient quantity of light to be irradiated onto the spectrum detector 1409 so that highly accurate spectrum information can be created. The AF unit 1410 creates focusing signals that are used to focus the focal point of the camera 1408 and, in order for highly accurate focusing to be performed, it is necessary for a sufficient quantity of light to be irradiated onto a light detecting element (not shown) inside the AF unit 1410.

However, in the imaging method employed by the conventional microscope device 1400, light from the test specimen 1401 is split three-ways by the beam splitter 1411 and the beam splitter 1412, and the light which has been split three-ways is irradiated onto each one of the camera 1408, the AF unit 1410, and the spectrum detector 1409 so that image acquisition of the test specimen, creation of a focusing signal, and creation of spectrum information are performed. In this manner, in the conventional microscope device 1400, because the light from the test specimen 1401 is split three-ways, it is not possible to obtain a sufficient quantity of light to create a focusing signal and to create spectrum information. As a consequence, the microscope device 1400 is not able to perform highly accurate auto-focusing, and it is not possible to achieve a satisfactory improvement in the color reproducibility of the acquired image of the test specimen 1401.

SUMMARY

The present invention provides an imaging method and microscope device that make it possible to perform highly accurate auto-focusing, and to further improve the color reproducibility of acquired image data.

An imaging method may include a first step in which light from a test specimen is guided to an imaging unit along a first optical path, a second step in which light from the test specimen is guided to an autofocus unit along a second optical path, a third step in which the light guided to the autofocus unit is split, and is guided on a third optical path and a fourth optical path whose image point is different from that of the third optical path, a fourth step in which, based on a difference in contrast between the light that is guided on the third optical path and is projected onto a first plane and the light that is guided on the fourth optical path and is projected onto the first plane, a focal point of the imaging unit is adjusted such that an image of the test specimen that is created by the light from the test specimen guided on the first optical path is formed on an imaging surface of the imaging unit, a fifth step in which, using the light guided to the imaging unit, an image of the test specimen is acquired and image data is created, a sixth step in which, using the light guided to the autofocus unit, spectrum information for the test specimen is detected, and a seventh step in which, based on the spectrum information that has been detected, a color tone of the image data is corrected.

In the sixth step, the spectrum information for the test specimen may be detected using at least one of the light guided on the third optical path and the light guided on the fourth optical path.

In the sixth step, the light guided on the third optical path and the light guided on the fourth optical path may pass through a color mixing unit.

The imaging method may further include an eighth step in which a portion of the light guided on the fourth optical path is guided on a fifth optical path so as to form an image on the first plane, and a ninth step in which the light guided on the fifth optical path is color-mixed. In the sixth step, the spectrum information for the test specimen may be detected using the light that was color-mixed in the ninth step.

In the fourth step, a sensor that is located on the first plane may detect a difference in contrast between the light that is guided on the third optical path and is projected onto the first plane and the light that is guided on the fourth optical path and is projected onto the first plane. In the sixth step, the sensor may detect spectrum information for the test specimen.

In the fourth step, a first sensor that is located on the first plane may detect a difference in contrast between the light that is guided on the third optical path and is projected onto the first plane and the light that is guided on the fourth optical path and is projected onto the first plane. In the sixth step, a second sensor that is located on the first plane may detect spectrum information for the test specimen.

In the fourth step, a first sensor that is located on the first plane may detect a difference in contrast between the light that is guided on the third optical path and is projected onto the first plane and the light that is guided on the fourth optical path and is projected onto the first plane. In the sixth step, a second sensor that is located on a second plane which is offset in a direction in which the focal point of the light guided on the third optical path or the fourth optical path is more unfocussed than it is on the first plane may detect spectrum information for the test specimen.

A microscope device may include an imaging unit that receives light from a test specimen, and creates image data by photographing an image of the test specimen, a first beam splitter that splits light from the test specimen between a first optical path that guides the light to the imaging unit and a second optical path that guides the light to an autofocus unit, a second beam splitter that splits the light guided to the autofocus unit between a third optical path and a fourth optical path whose image point is different from that of the third optical path, a light detector that receives the light guided on the third optical path and the light guided on the fourth optical path, the light detector detecting a difference in contrast between the light guided on the third optical path and the light guided on the fourth optical path, the light detector detecting spectrum information for the test specimen using the light guided to the autofocus unit, a focal point adjustment unit that, based on the difference in contrast detected by the light detector, adjusts the focal point of the imaging unit such that an image of the test specimen that is created by the light from the test specimen that is guided on the first optical path is formed on the imaging surface of the imaging unit, and a color tone correction unit that, based on the spectrum information detected by the light detector, corrects the color tone of the image data created by the imaging unit.

According to the present invention, light from a test specimen is guided by a first optical path to an imaging unit. Furthermore, light from the test specimen is guided by a second optical path to an autofocus unit. The light that is guided to the autofocus unit is split and is then guided on a third optical path and on a fourth optical path whose image point is different from that of the third optical path. Based on the difference in contrast between the light that is guided on the third optical path and is projected onto a first plane and the light that is guided on the fourth optical path and is projected onto the first plane, the focal point of the imaging unit is adjusted such that the image of the test specimen that is created by the light from the test specimen that is guided on the first optical path is formed on the image surface of the imaging unit. Moreover, using the light guided to the autofocus unit, spectrum information of the test specimen is detected, and the color tone of the image data is corrected based on the detected spectrum information. Because it is possible as a result of this to keep any attenuation of the light that is guided to the imaging unit and the autofocus unit to a minimum, it is possible to perform auto-focusing having a greater degree of accuracy, and to improve the color reproducibility of acquired image data even further.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

First Preferred Embodiment

Figure 1:
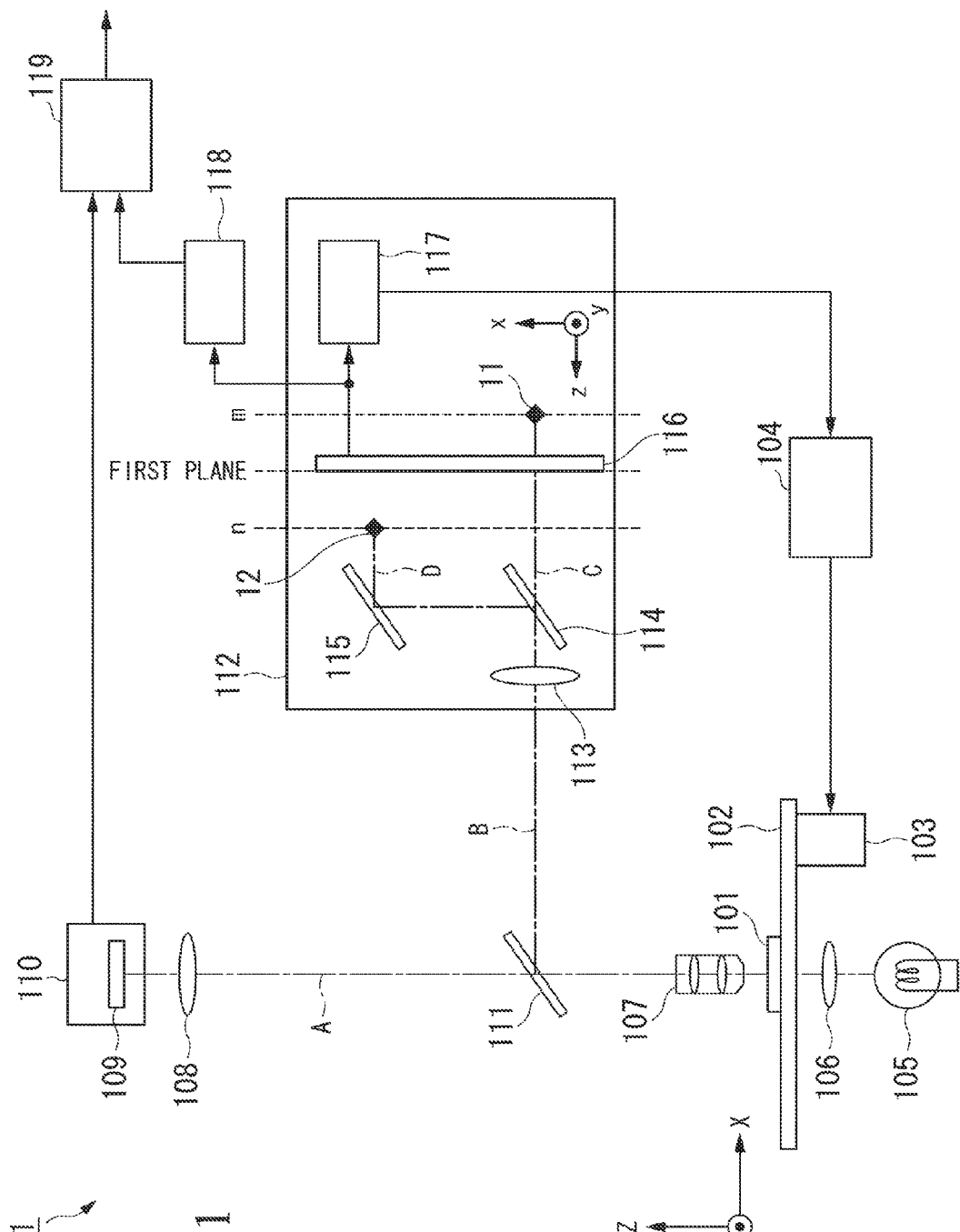
FIG. 1 is a schematic view illustrating a structure of a microscope device in accordance with a first preferred embodiment of the present invention.

A first preferred embodiment of the present invention will be described with reference made to the drawings. FIG. 1 is a schematic view illustrating a structure of a microscope device 1 in accordance with the first preferred embodiment of the present invention. In the example shown in the drawings, the microscope device 1 includes a stage 102, a stage drive unit 103, a stage control unit 104, a light source 105, a condenser lens 106, an objective lens 107, a first imaging lens 108, an imaging unit 110 including an imaging element 109, a first beam splitter 111, an AF (autofocus) unit 112, a spectrum detection unit 118, and a color tone correction unit 119. Moreover, the AF unit 112 includes a second imaging lens 113, a second beam splitter 114, a mirror 115, a light detector 116, and a contrast detection unit 117. The AF unit 112 creates a differential contrast signal that is used to place an image of a test specimen 101 that is projected onto the imaging element 109 of the imaging unit 110 in a focused state, and creates spectrum information that is used to correct the color reproducibility of the image data created by the imaging unit 110.

The stage 102 is a base on which the test specimen 101 is mounted. The stage drive unit 103 drives the stage 102 in horizontal and vertical directions. The stage control unit 104 controls the stage drive unit 103. The light source 105 generates light so as to provide transmitted illumination for the test specimen 101. The condenser lens 106 condenses the light generated by the light source 105 and irradiates it onto the test specimen 101. The objective lens 107 is formed by a plurality of lenses, and is positioned such that it faces the test specimen 101. In addition, the objective lens 107 condenses luminous flux from the test specimen 101.

The first beam splitter 111 is located on the optical axis of the objective lens 107 and between the objective lens 107 and the first imaging lens 108. The first beam splitter 111 allows a portion of the light condensed by the objective lens 107 to be transmitted and reflects a portion thereof. As a result of this, the first beam splitter 111 splits the light condensed by the objective lens 107 between the direction of the first imaging lens 108 (i.e., the direction of the imaging unit 110) and the direction of the second imaging lens 113 which is provided in the AF unit 112. Note that the optical path of the light which is transmitted by the first beam splitter 111 and is irradiated onto the first imaging lens 108 is referred to as the optical path A (i.e., a first optical path). In addition, the optical path of the light which is reflected by the first beam splitter 111 and is irradiated onto the second imaging lens 113 which is provided in the AF unit 112 is referred to as the optical path B (i.e., a second optical path).

The first imaging lens 108 is located on the optical axis of the objective lens 107, and forms an image of the light which has been condensed by the objective lens 107 and transmitted through the first beam splitter 111 on the imaging surface of the imaging element 109 which is provided in the imaging unit 110. As a result of this, light from the test specimen 101 is guided to the imaging element 109. The imaging element 109 which is provided in the imaging unit 110 receives light from the test specimen 101, and photoelectrically converts the received light into an electrical signal that corresponds to the intensity of the received light. The imaging unit 110 creates image data for the test specimen 101 based on the electrical signal which has been photoelectrically converted by the imaging element 109. The imaging unit 110 also inputs the created image data into the color tone correction unit 119.

The second imaging lens 113 forms an image of the light which has been condensed by the objective lens 107 and reflected by the first beam splitter 111. The second beam splitter 114 is located on an extension of the optical path B and between the second imaging lens 113 and the light detector 116. The second beam splitter 114 allows a portion of the light condensed by the second imaging lens 113 to be transmitted and reflects a portion thereof. As a result of this, the second beam splitter 114 splits the light from the second imaging lens 113 between the direction of the light detector 116 and the direction of the mirror 115. The mirror 115 reflects the light that was reflected by the second beam splitter 114 in the direction of the light detector 116. Note that the optical path of the light which is transmitted by the second beam splitter 114 and is irradiated onto the light detector 116 is referred to as the optical path C (i.e., a third optical path). In addition, the optical path of the light which is reflected by the second beam splitter 114 and then reflected by the mirror 115, and is then irradiated onto the light detector 116 is referred to as the optical path D (i.e., a fourth optical path). Note also that the mirror 115 is positioned so as to be substantially parallel with the optical path C and the optical path D. Moreover, because the optical path C is an optical path along which light is guided from the second beam splitter 114 directly to the light detector 116, while the optical path D is an optical path along which light is guided from the second beam splitter 114 to the light detector 116 via the mirror 115, the optical path length of the optical path D is longer than the optical path length of the optical path C.

The light detector 116 is located on the optical path C and the optical path D, and receives both light from the test specimen 101 that is guided on the optical path C, and light from the test specimen 101 that is guided on the optical path D. The light detector 116 then photoelectrically converts the received light into electrical signals that correspond to the intensity of the received light and outputs these signals. Note that the plane formed by the light detection surface of the light detector 116 is referred to as a first plane. Based on the electrical signals output by the light detector 116, the contrast detection unit 117 detects the difference between the contrast of the light from the test specimen 101 that was guided on the optical path C and irradiated onto the light detector 116 and the contrast of the light from the test specimen 101 that was guided on the optical path D and irradiated onto the light detector 116. The contrast detection unit 117 also generates a contrast signal that shows the detected difference in contrast, and inputs the created contrast signal into the stage control unit 104.

The spectrum detection unit 118 creates spectrum information for the projected light based on the electrical signals output by the light detector 116. The spectrum detection unit 118 also inputs the created spectrum information into the color tone correction unit 119. Based on this spectrum information, the color tone correction unit 119 performs color tone correction on the image data created by the imaging unit 110.

Note that, in FIG. 1, a direction which is parallel with the optical path A is referred to as the Z-axis, a direction which is parallel with the optical path B is referred to as the X-axis, and a direction which is perpendicular to both the X-axis and the Z-axis is referred to as the Y-axis. Furthermore, the microscope device 1 has a computer system (not shown) that includes a CPU (central processing unit), ROM (read only memory), RAM (random access memory), and an external storage device and the like. In addition, the steps of the processing performed by the above described stage control unit 104, imaging unit 110, spectrum detection unit 118, and color tone correction unit 119 are controlled by this computer system.

Figure 2:
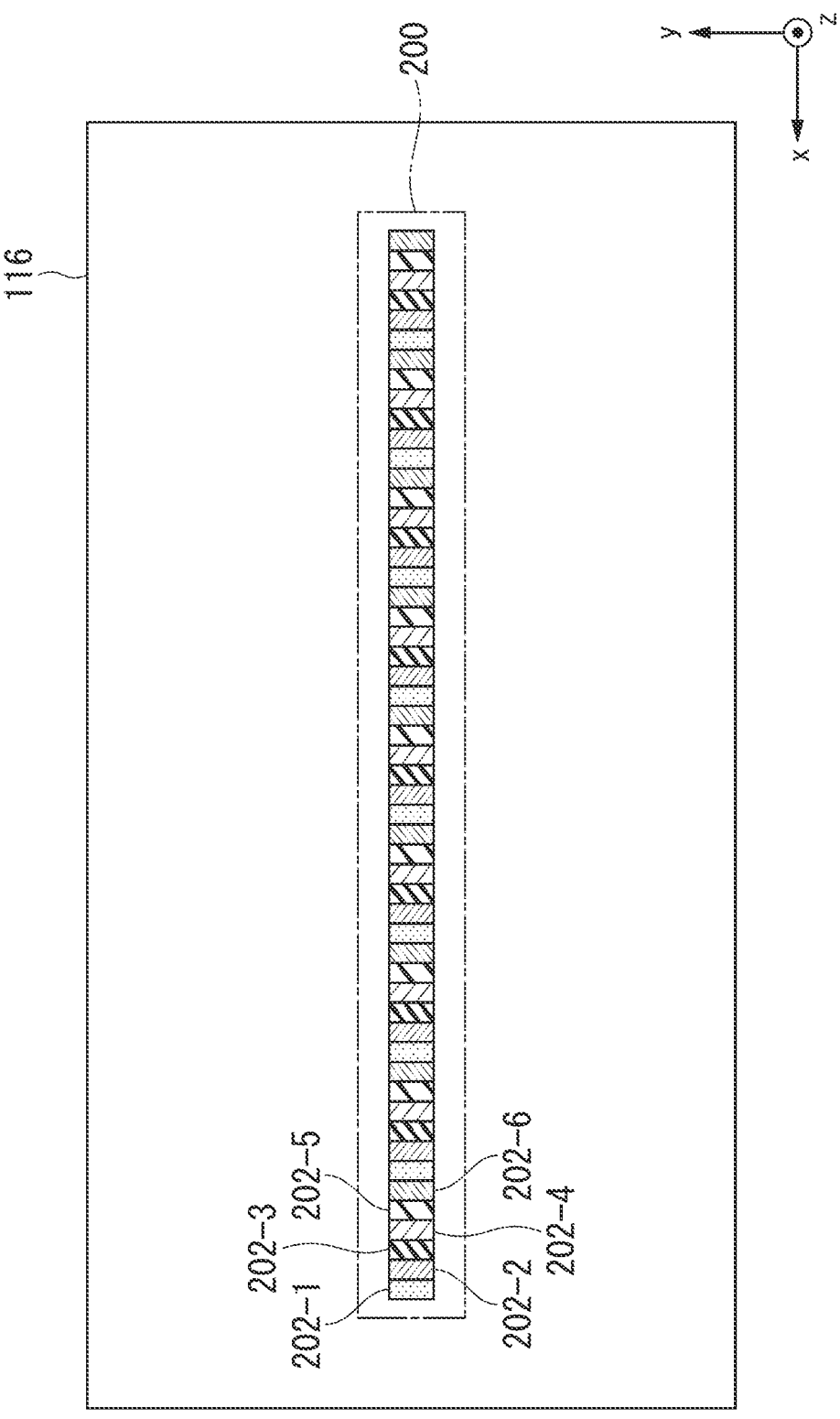
FIG. 2 is a top surface view of a light detector in accordance with the first preferred embodiment of the present invention.
Figure 3:
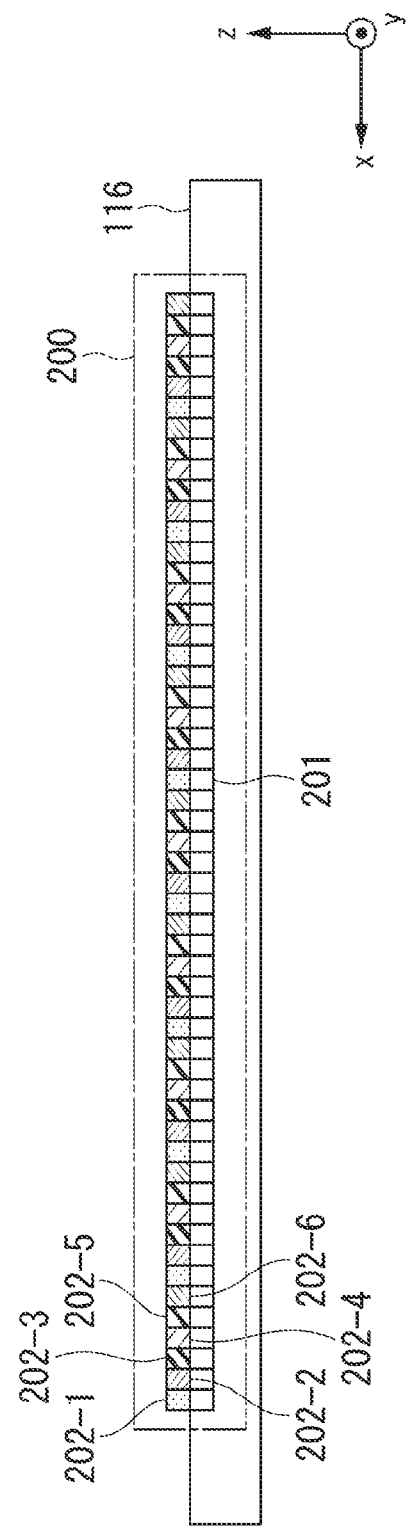
FIG. 3 is a cross-sectional view of the light detector in accordance with the first preferred embodiment of the present invention.

Next, the structure of the light detector 116 will be described. FIG. 2 is a top surface view of the light detector 116 in accordance with the first preferred embodiment of the present invention. FIG. 3 is a cross-sectional view of the light detector 116 in accordance with the first preferred embodiment of the present invention. As is shown in these drawings, the light detector 116 includes a line sensor 200 which is formed by a plurality of light receiving elements 201 arranged in a straight line. Color filters 202-1, 202-2, 202-3, . . . , 202-$n$ (wherein n is an integer, in the first preferred embodiment n is set as 6) that each have a mutually different spectral transmittance are arranged in a repeating pattern on the light receiving surfaces of the light receiving elements 201. By employing this structure, the respective light receiving elements 201 included in the line sensor 200 are able to detect spectrum information of mutually different wavelengths.

Figure 4:
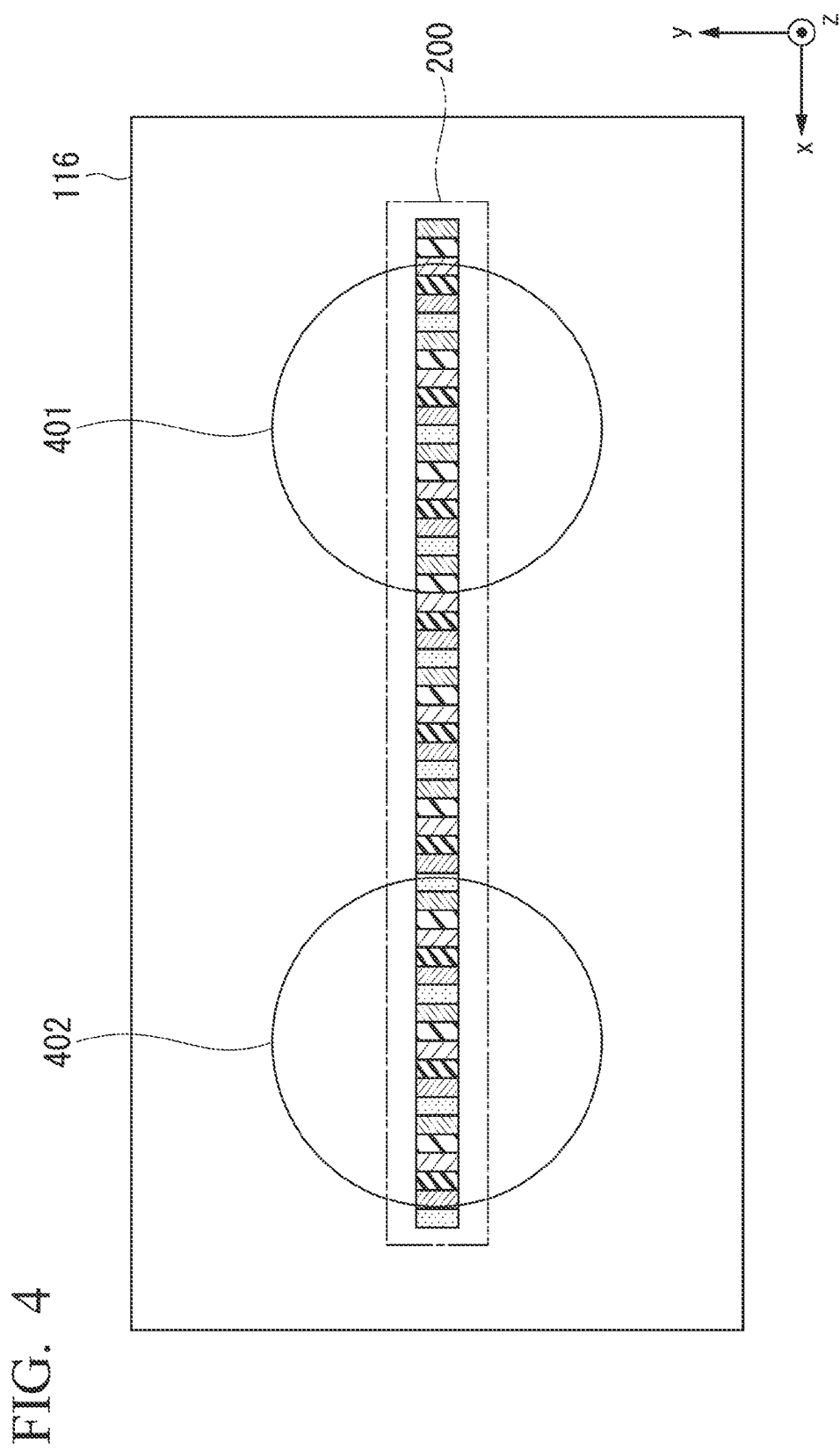
FIG. 4 is a schematic view illustrating an area where a projection image which is projected onto the light detector is displayed in accordance with the first preferred embodiment of the present invention.

FIG. 4 is a schematic view illustrating an area where, in the first preferred embodiment of the present invention, a projection image which is projected onto the light detector 116 and is formed by light guided on the optical path C is displayed, and an area where a projection image which is projected onto the light detector 116 and is formed by light guided on the optical path D is displayed. In the first preferred embodiment of the present invention, the projection image formed by the light guided on the optical path C (i.e., the light which has been transmitted by the second beam splitter 114) is projected onto an area 401. Moreover, the projection image formed by the light guided on the optical path D (i.e., the light which has been reflected by the second beam splitter 114 and then reflected by the mirror 115) is projected onto an area 402. As is described above, the optical path length of the optical path D is longer than the optical path length of the optical path C. Because of this, the image point of the light guided on the optical path C is behind the light detector 116 (in FIG. 1, this is a rear focus position 11 on the plane m), while the image point of the light guided on the optical path D is in front of the light detector 116 (in FIG. 1, this is a front focus position 12 on the plane n).

Next, the signal output by the light detector 116 will be described. The light detector 116 receives the light guided on the optical path C and irradiated thereon, and the light guided on the optical path D and irradiated thereon, and photoelectrically converts the received light into electrical signals that correspond to the intensity of the received light and outputs these signals. Here, an electrical signal obtained as a result of the light detector 116 photoelectrically converting an image (i.e., light) that has been guided on the optical path C is defined as a rear focus signal, while an electrical signal obtained as a result of the light detector 116 photoelectrically converting an image that has been guided on the optical path D is defined as a front focus signal.

Next, the signal created by the contrast detection unit 117 will be described. The front focus signal and rear focus signal output by the light detector 116 are input into the contrast detection unit 117. The contrast detection unit 117 detects differences in contrast between the front focus signal and the rear focus signal, and creates a differential contrast signal. Specifically, the contrast detection unit 117 firstly finds the absolute values of output differences between pixels of the light receiving elements of both the front focus signal and the rear focus signal, and uses the total sums thereof to create a front focus contrast signal and a rear focus contrast signal. Next, the contrast detection unit 117 finds the difference between the front focus contrast signal and the rear focus contrast signal so as to create a differential contrast signal.

Figure 5:
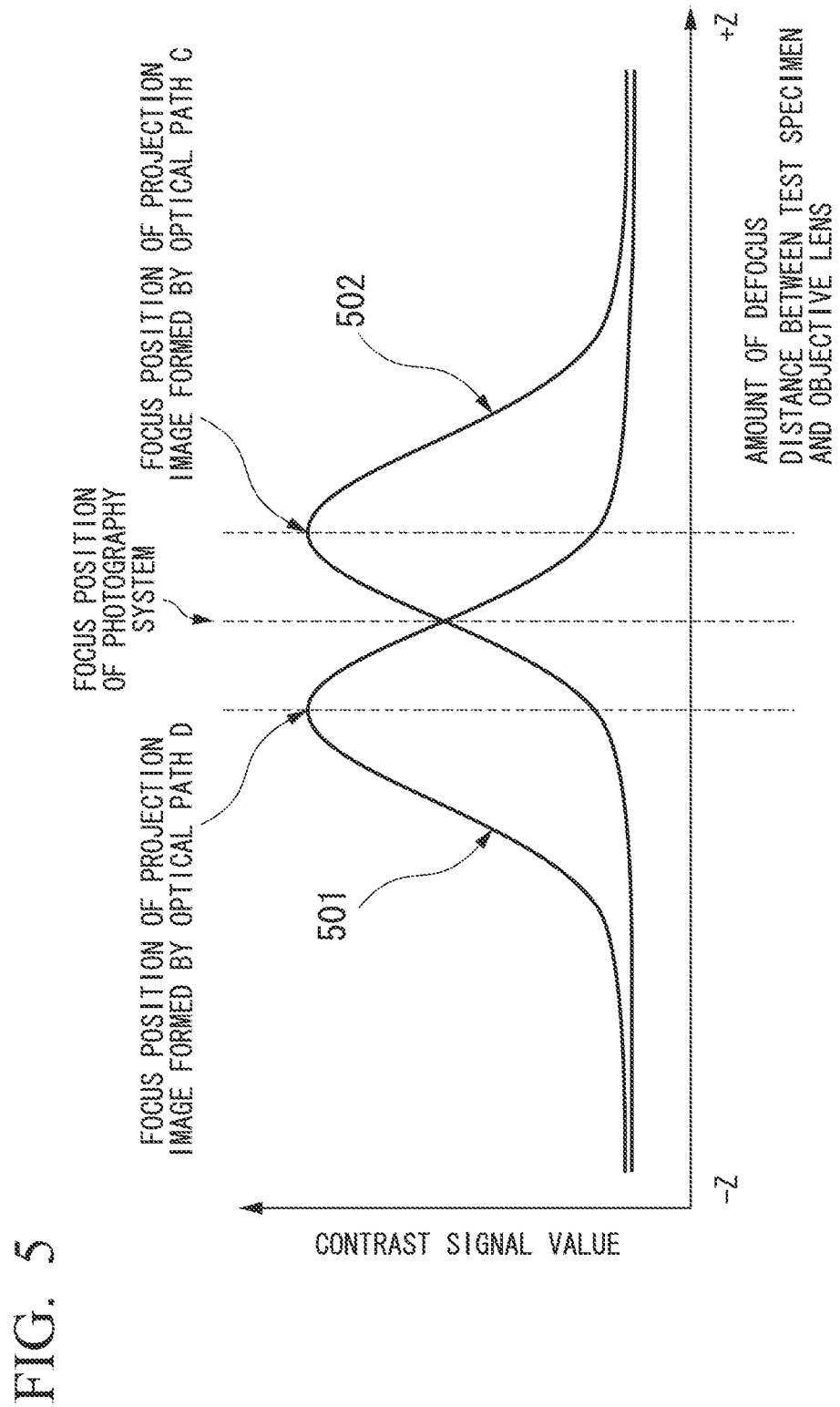
FIG. 5 is a graph illustrating changes in a front focus contrast signal and a rear focus contrast signal when a position of a test specimen is changed in a direction of an optical axis in accordance with the first preferred embodiment of the present invention.

FIG. 5 is a graph illustrating changes in the front focus contrast signal and rear focus contrast signal when the position of the test specimen 101 in the direction of the optical axis (i.e., in the Z-axial direction) is changed. The horizontal axis in the graph shows the distance between the test specimen 101 and the objective lens 107 (i.e., the amount of defocus), while the vertical axis shows the value of the contrast signal. The curve 501 shows a relationship between the amount of defocus and the value of the front focus contrast signal. The curve 502 shows a relationship between the amount of defocus and the value of the rear focus contrast signal. As the test specimen 101 which has been mounted on the stage 102 which moves in the Z-axial direction is moved from a position sufficiently far from the objective lens 107 (i.e., −Z) to a position sufficiently close thereto (i.e., +Z), firstly, the value of the front focus contrast signal reaches maximum at the focus position of the projection image created on the optical path D (i.e., the front focus position) and thereafter decreases. Next, the value of the rear focus contrast signal reaches maximum at the focus position of the projection image created on the focal path C (i.e., the rear focus position) and thereafter decreases.

Figure 6:
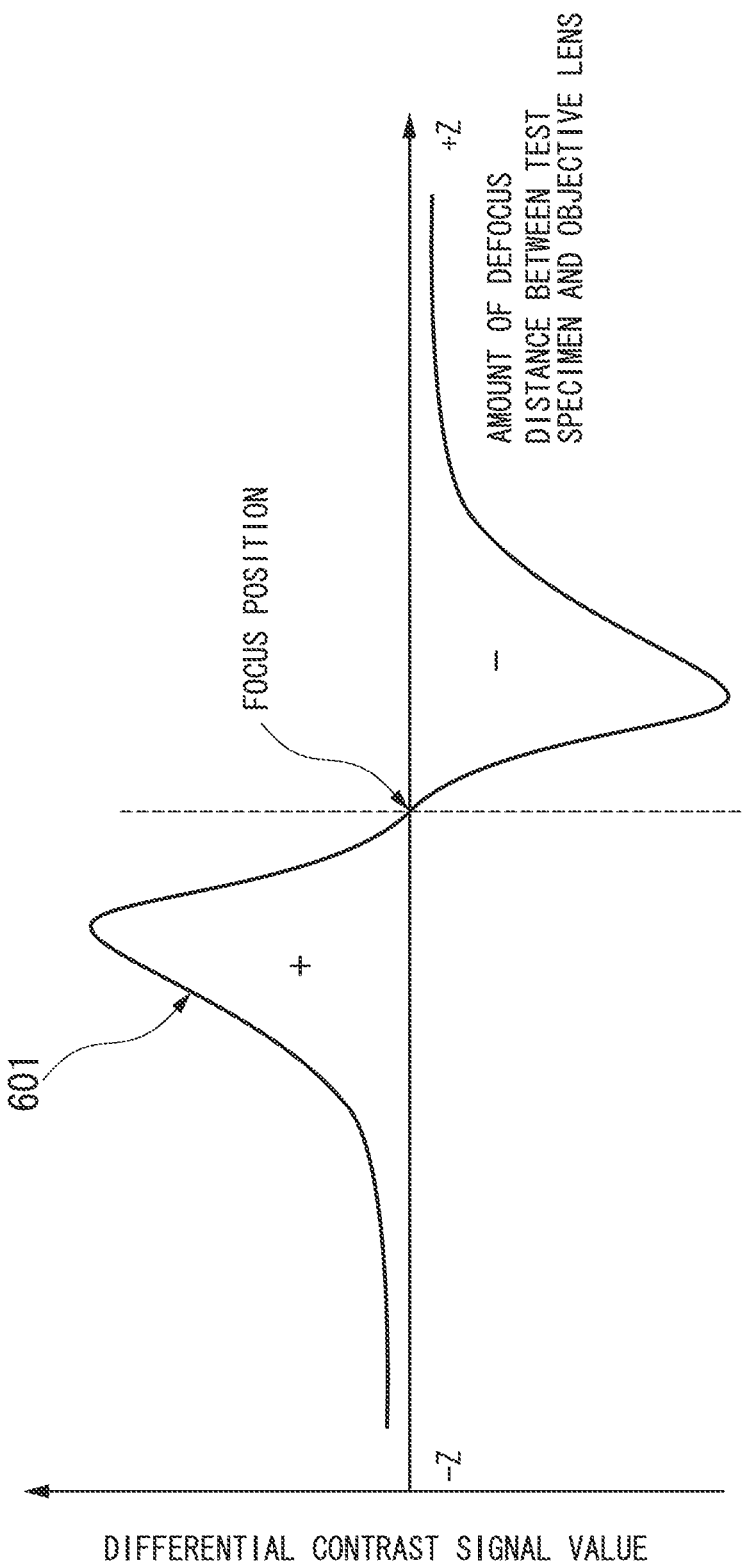
FIG. 6 is a graph illustrating changes in a value of a differential contrast signal when a position of the test specimen is changed in the direction of the optical axis in accordance with the first preferred embodiment of the present invention.

FIG. 6 is a graph illustrating changes in the value of the differential contrast signal when the position of the test specimen 101 in the direction of the optical axis (i.e., in the Z-axial direction) is changed. The horizontal axis in the graph shows the distance between the test specimen 101 and the objective lens 107 (i.e., the amount of defocus), while the vertical axis shows the value of the differential contrast signal. The curve 601 shows a relationship between the amount of defocus and the value of the differential contrast signal. As the test specimen 101 which has been mounted on the stage 102 which moves in the Z-axial direction is moved from a position sufficiently far from the objective lens 107 (i.e., −Z) to a position sufficiently close thereto (i.e., +Z), the value of the differential contrast signal traces an S curve which becomes extremely large at the focus position of the projection image created by the optical path D and thereafter abruptly decreases to zero, and becomes extremely small at the position of the projection image created by the optical path C.

Note that in the first preferred embodiment of the present invention, the imaging surface of the imaging element 109 included in the imaging unit 110 is placed in a position where the image of the test specimen 101 is formed when the value of the differential contrast signal equals zero. Because of this, if the stage control unit 104 moves the position of the test specimen 101 (i.e., the position of the stage 102) in the Z-axial direction such that the value of the differential contrast signal input from the contrast detection unit 117 equals zero, the focus of the imaging element 109 can be controlled so as to be focused on the test specimen 101 (optical path difference AF). Note that the processing to control the focus of the imaging element 109 so that it is focused on the test specimen 101 is known as focus processing.

In the first preferred embodiment of the present invention, when the value of the input differential contrast signal is positive, the stage control unit 104 determines that the focus of the imaging unit 109 is in a front focus state, and causes the stage drive unit 103 to drive the stage 102 in the −Z-axial direction for a distance that corresponds to the size of the differential contrast signal. When the value of the input differential contrast signal is negative, the stage control unit 104 determines that the focus of the imaging unit 109 is in a rear focus state, and causes the stage drive unit 103 to drive the stage 102 in the +Z-axial direction for a distance that corresponds to the size of the differential contrast signal. The stage control unit 104 repeats this operation until the value of the input differential contrast signal reaches zero. At this point, it determines that the imaging element 109 is in a focused state, and the focus processing is ended.

Next, an operation of the microscope device 1 in accordance with the first preferred embodiment of the present invention will be described. Firstly, the stage control unit 104 causes the stage drive unit 103 to drive the stage 102 in a horizontal direction, so that a predetermined projection area of the test specimen 101 which is to be photographed is moved onto the optical axis of the objective lens 107. Next, the light source 105 generates light that is irradiated onto the test specimen 101. The light that is transmitted through the test specimen 101 is condensed by the objective lens 107, and is split between the direction of the first imaging lens 108 and the direction of the AF unit 112 by the first beam splitter 111.

The light that has been split in the direction of the first imaging lens 108 is irradiated via the first imaging lens 108, namely, is guided on the optical path A onto the imaging surface of the imaging element 109 provided in the imaging unit 110 (first step). In contrast, the light that has been split in the direction of the AF unit 112 is guided on the optical path B and is irradiated onto the AF unit 112 (second step). The light irradiated onto the AF unit 112 is firstly transmitted through the second imaging lens 113 which forms part of the AF unit 112, and is then irradiated onto the second beam splitter 114. The light that is irradiated onto the second beam splitter 114 is split between the direction of the light detector 116 and the direction of the mirror 115.

The light that has been split in the direction of the light detector 116 is guided on the optical path C and is projected onto the light detector 116. The projection image created by the light guided on the optical path C is projected onto the area 401 shown in FIG. 4. In contrast, the light that has been split in the direction of the mirror 115 is projected onto the light detector 116 via the mirror 115, namely, is guided on the optical path D. The projection image created by the light guided on the optical path D is projected onto the area 402 shown in FIG. 4 (third step).

Next, the light detector 116 receives the light guided on the optical path C and irradiated onto the area 401, and the light guided on the optical path D and irradiated onto the area 402, and outputs a front focus signal and a rear focus signal that correspond to the intensity of the received light. The front focus signal and rear focus signal output by the light detector 116 are input into the contrast detection unit 117. The contrast detection unit 117 detects the difference in contrast between the front focus signal and rear focus signal, and creates a differential contrast signal which it then inputs into the stage control unit 104. The stage control unit 104 moves the position of the test specimen 101 (i.e., the position of the stage 102) in the Z-axial direction such that the value of the differential contrast signal input from the contrast detection unit 117 equals zero, and controls the focus of the imaging element 109 such that it is focused on the test specimen 101. When the value of the differential contrast signal input from the contrast detection unit 117 reaches zero, the stage control unit 104 determines that the imaging element 109 is in a focused state, and ends the focus processing (fourth step).

After the focus processing has ended, the imaging unit 110 receives a command from a computer system (not shown) instructing it to photograph the test specimen 101, and then create image data for the test specimen 101. Thereafter, the imaging unit 110 inputs the created image data into the color tone correction unit 119 (fifth step).

Moreover, when the imaging unit 110 is photographing an image of the test specimen 101, namely, when the differential contrast signal equals zero, light that is unfocused, namely, is either in a front focus state or a rear focus state and that has equal amounts of contrast is irradiated onto the light detector 116. Namely, the light that is guided on the optical path C and the optical path D and is irradiated onto the light detector 116 is in a blurry, unfocused state. Consequently, the light resulting from the color-mixing of an image of a predetermined area of the test specimen 101 is irradiated onto the area 401 and the area 402 of the light detector 116. Color filters 202-1, 202-2, 202-3, ..., 202-n that have mutually different spectral transmittances are mounted on the respective light receiving elements 201 of the line sensor 200 provided in the light detector 116. By employing this structure, the respective light receiving elements 201 of the line sensor 200 photoelectrically convert light which corresponds to the spectrum of the color filters 202-1, 202-2, 202-3, ..., 202-n. Electrical signals that correspond to the intensity of the light of the respective spectrums and that have been photoelectrically converted by the respective light receiving elements 201 of the line sensor 200 provided in the light detector 116 are input into the spectrum detection unit 118. The spectrum detection unit 118 performs signal processing on the input electrical signals, and creates spectrum information showing color information for the test specimen 101 which it then inputs into the color tone correction unit 119 (sixth step). Note that this processing to create spectrum information is known as spectrum detection processing.

Next, based on the spectrum information created by the spectrum information detection unit 118, the color tone correction unit 119 corrects the image data created by the imaging unit 110 such that the color reproducibility thereof is accurate, and then creates an estimated spectral transmittance image which it then outputs (seventh step).

As has been described above, according to the first preferred embodiment of the present invention, the microscope device 1 splits light from the test specimen 101 two-ways which it then sends respectively to the imaging unit 110 and the AF unit 112. Of this light which has been split two-ways, the imaging unit 110 uses one light to acquire an image of the test specimen 101, and create image data. Meanwhile, the AF unit 112 uses the other light from the test specimen which has been split two-ways to create a differential contrast signal that is used to adjust the focus of the imaging element 109 of the imaging unit 110 to a focused state, and to create spectrum information that is used to accurately correct the color reproducibility of the image data created by the imaging unit 110. As a result, the light from the test specimen 101 is not split three-ways, as is the case conventionally, and it is possible to create image data, and a differential contrast signal, and also spectrum information. Accordingly, because the microscope device 1 is able to keep to a minimum any attenuation of the light that is irradiated onto the imaging unit 110 and the AF unit 112, it is possible to more accurately adjust the focus of the imaging element 109 to a focused state, and to create higher-quality image data, and to also correct the created image data such that the color reproducibility thereof is more accurate.

Note that in the first preferred embodiment of the present invention described above, an example is described in which the light detector 116 respectively detects a front focus signal, a rear focus signal, and spectrum information, and outputs each of these, however, the present invention is not limited to this. For example, instead of separately detecting the spectrum information, it is also possible for the light detector 116 to synthesize the front focus signal and the rear focus signal and output the result as spectrum information.

Second Preferred Embodiment

Figure 7:
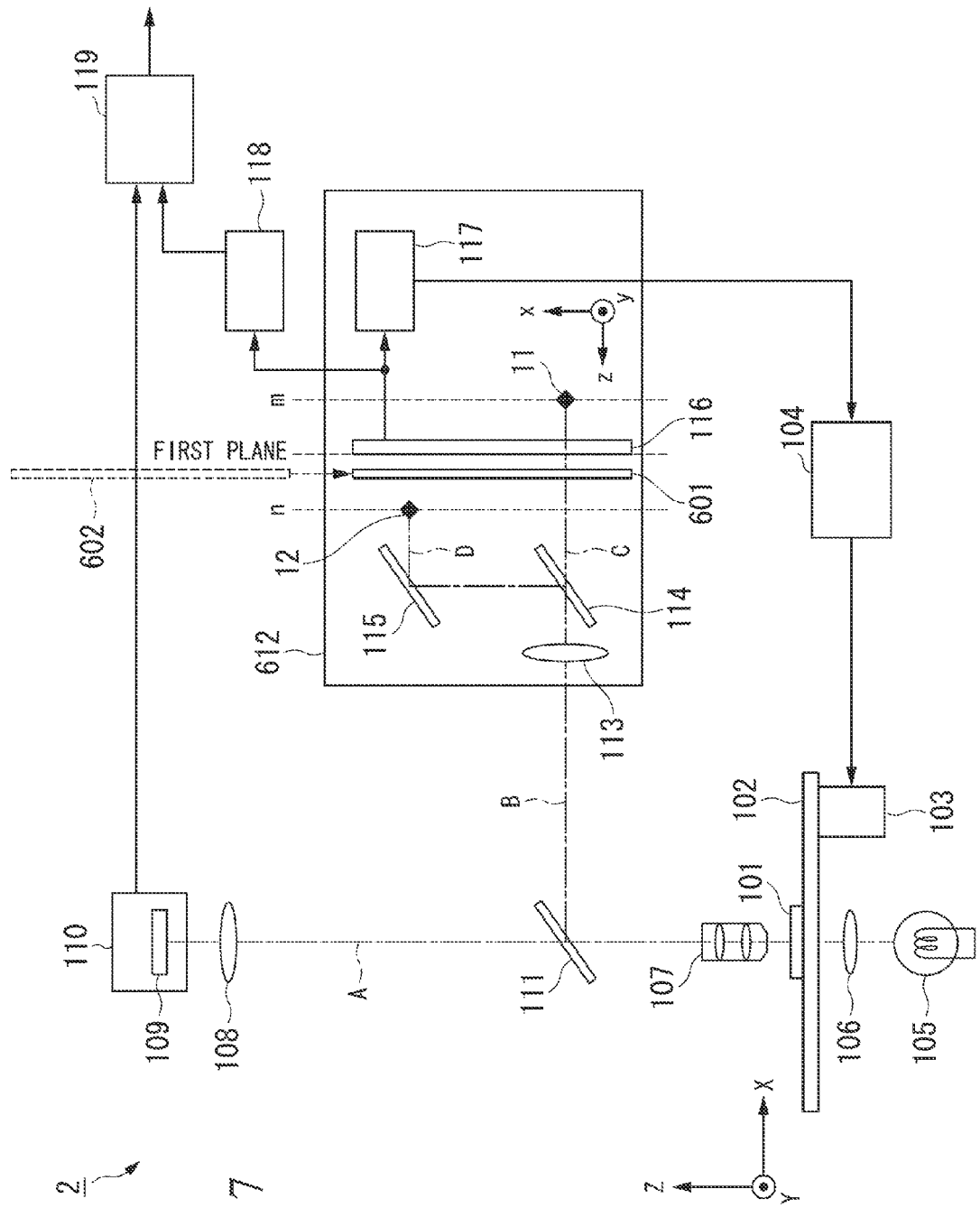
FIG. 7 is a schematic view illustrating a structure of a microscope device in accordance with a second preferred embodiment of the present invention.

A second preferred embodiment of the present invention will be described with reference made to the drawings. FIG. 7 is a schematic view illustrating a structure of a microscope device 2 in accordance with the second preferred embodiment of the present invention. The only difference between the structure of the microscope device 2 of the second preferred embodiment and the structure of the microscope device 1 of the first preferred embodiment is the structure of an AF unit 612. Note that in FIG. 7, component elements that are the same as those shown in FIG. 1 are given the same descriptive symbols as in FIG. 1.

The AF unit 612 includes the second objective lens 113, the second beam splitter 114, the mirror 115, the light detector 116, the contrast detection unit 117, and a color mixing unit 601. The second objective lens 113, the second beam splitter 114, the mirror 115, the light detector 116, and the contrast detection unit 117 are the same as their corresponding components in the first preferred embodiment. The color mixing unit 601 mixes light which is irradiated thereon and allows this light to pass through it.

In the second preferred embodiment of the present invention, unlike the first preferred embodiment, when the microscope device 2 is performing spectrum detection processing, the color mixing unit 601 is placed between the second beam splitter 114 and the light detector 116, and also between the mirror 115 and the light detector 116, namely, the color mixing unit 601 is inserted on both the optical path C and the optical path D. Note that when the microscope device 2 is performing processing other than spectrum detection processing, the color mixing unit 601 is moved to an area 602 above the AF unit 612.

By employing this structure, because the color mixing unit 601 is not positioned on the optical path C or the optical path D when focus processing is being performed, images are projected correctly on the light detector 116. Because of this, the microscope device 2 is able to correctly perform focus processing. In contrast, when spectrum detection processing is being performed, the color mixing unit 601 is positioned on both the optical path C and the optical path D. As a consequence, the microscope device 2 is able to obtain even more accurate spectrum information. Accordingly, the microscope device 2 in accordance with the second preferred embodiment of the present invention is able to correct image data created by the imaging unit 110 such that the color reproducibility becomes even more precise.

Third Preferred Embodiment

Figure 8:
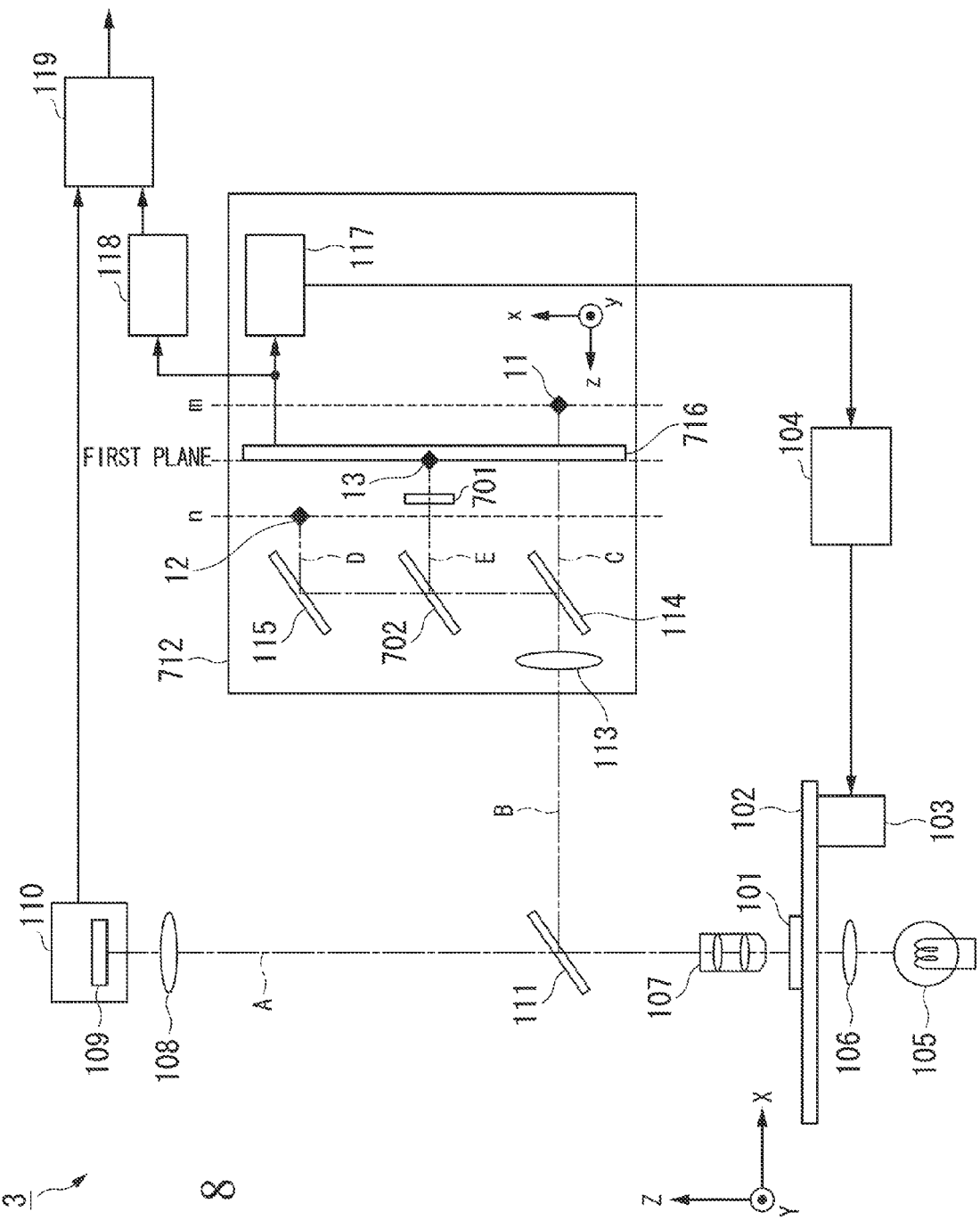
FIG. 8 is a schematic view illustrating a structure of a microscope device in accordance with a third preferred embodiment of the present invention.

A third preferred embodiment of the present invention will be described with reference made to the drawings. FIG. 8 is a schematic view illustrating a structure of a microscope device 3 in accordance with the third preferred embodiment of the present invention. The only difference between the structure of the microscope device 3 of the third preferred embodiment and the structure of the microscope device 1 of the first preferred embodiment is the structure of an AF unit 712. Note that in FIG. 8, component elements that are the same as those shown in FIG. 1 are given the same descriptive symbols as in FIG. 1.

The AF unit 712 includes the second objective lens 113, the second beam splitter 114, the mirror 115, the contrast detection unit 117, a color mixing unit 701, a third beam splitter 702, and a light detector 716. The second objective lens 113, the second beam splitter 114, the mirror 115, and the contrast detection unit 117 are the same as their corresponding components in the first preferred embodiment of the present invention.

The color mixing unit 701 mixes light which is irradiated thereon and allows this light to pass through it. The third beam splitter 702 is located on the optical path D and between the second beam splitter 114 and the mirror 115. The third beam splitter 702 allows a portion of the light from the second beam splitter 114 to be transmitted through it, but also reflects a portion of this light. Consequently, the third beam splitter 702 splits the light from the second beam splitter 114 two-ways, namely, in the direction of the mirror 115 and in the direction of the color mixing unit 701. Note that the optical path of light that is transmitted through the third beam splitter 702, reflected by the mirror 115, and is irradiated onto the light detector 716 is the optical path D. Moreover, the optical path of light that is reflected by the third beam splitter 702, is transmitted through the color mixing unit 701, and is irradiated onto the light detector 716 is called an optical path E (i.e., a fifth optical path).

Note that in the third preferred embodiment of the present invention, in the same way as in the first preferred embodiment, the imaging surface of the imaging element 109 included in the imaging unit 110 is placed in the position where the image of the test specimen 101 is formed when the value of the differential contrast signal output by the light detector 116 equals zero. Moreover, the AF unit 712 is positioned such that, when an image of the test specimen 101 is formed on the imaging surface of the imaging element 109, the light that is guided on the optical path E forms an image on the first plane, which is the light detection surface of the light detector 716.

Figure 9:
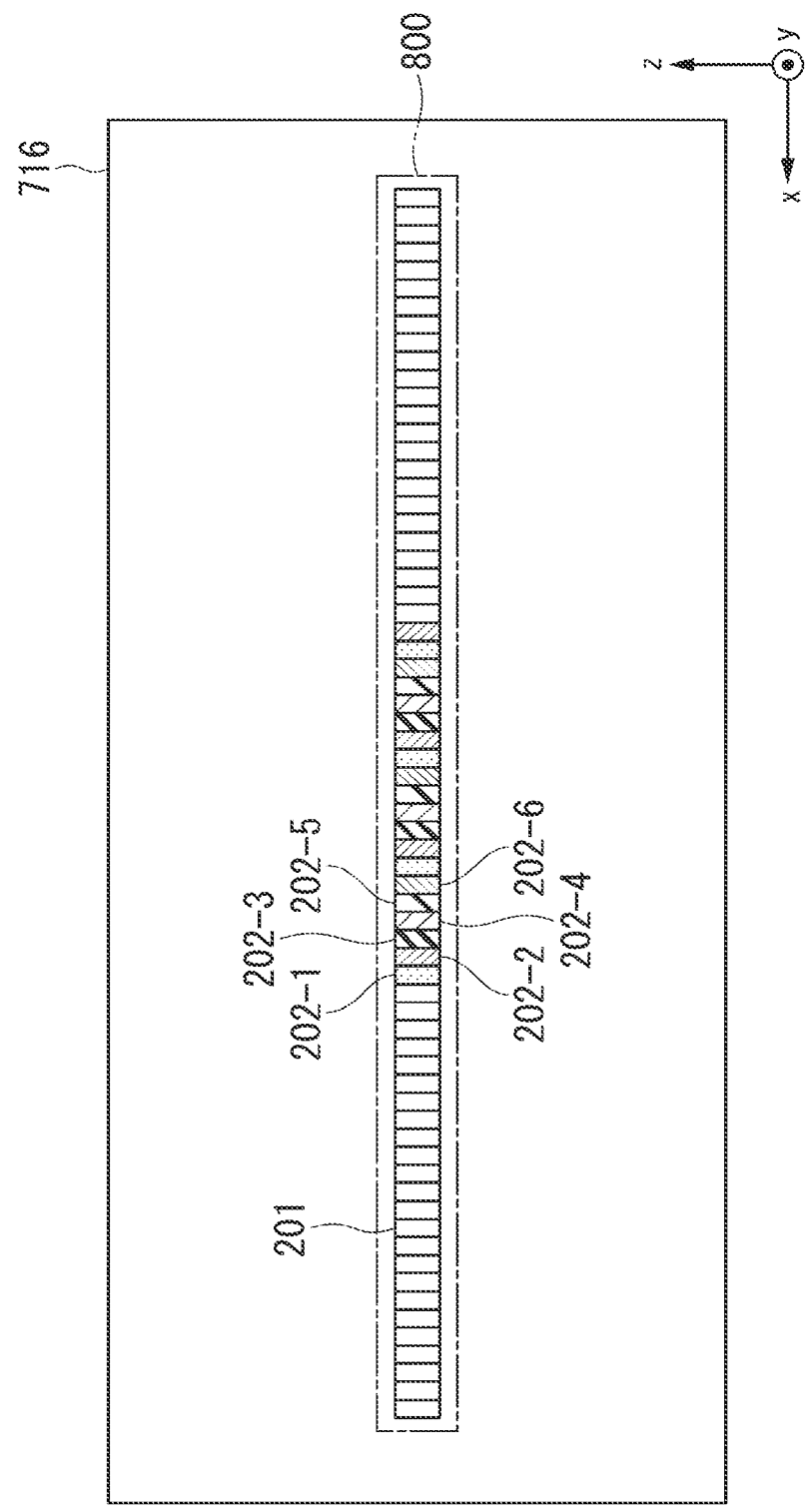
FIG. 9 is a top surface view of a light detector in accordance with the third preferred embodiment of the present invention.
Figure 10:
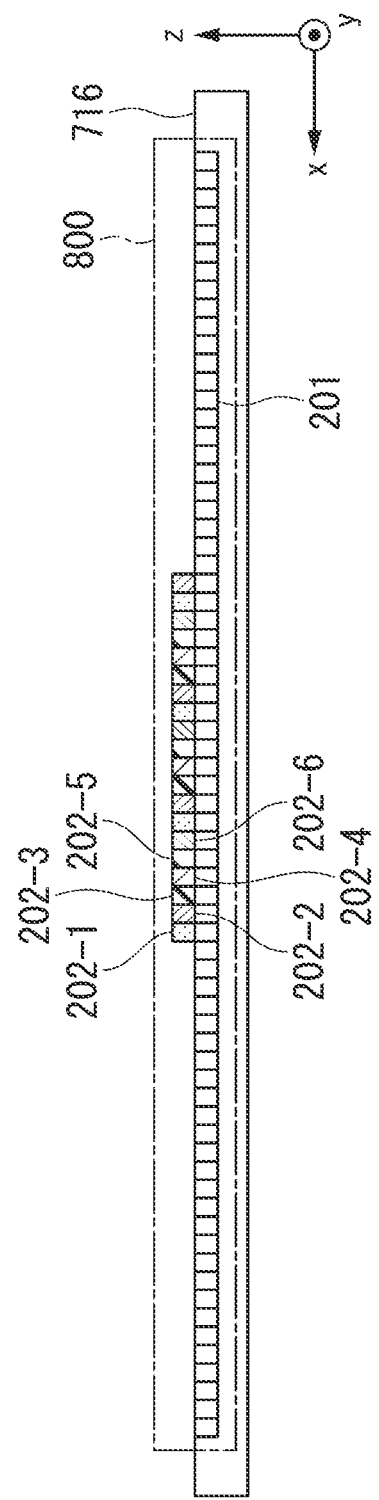
FIG. 10 is a cross-sectional view of the light detector in accordance with the third preferred embodiment of the present invention.
Figure 11:
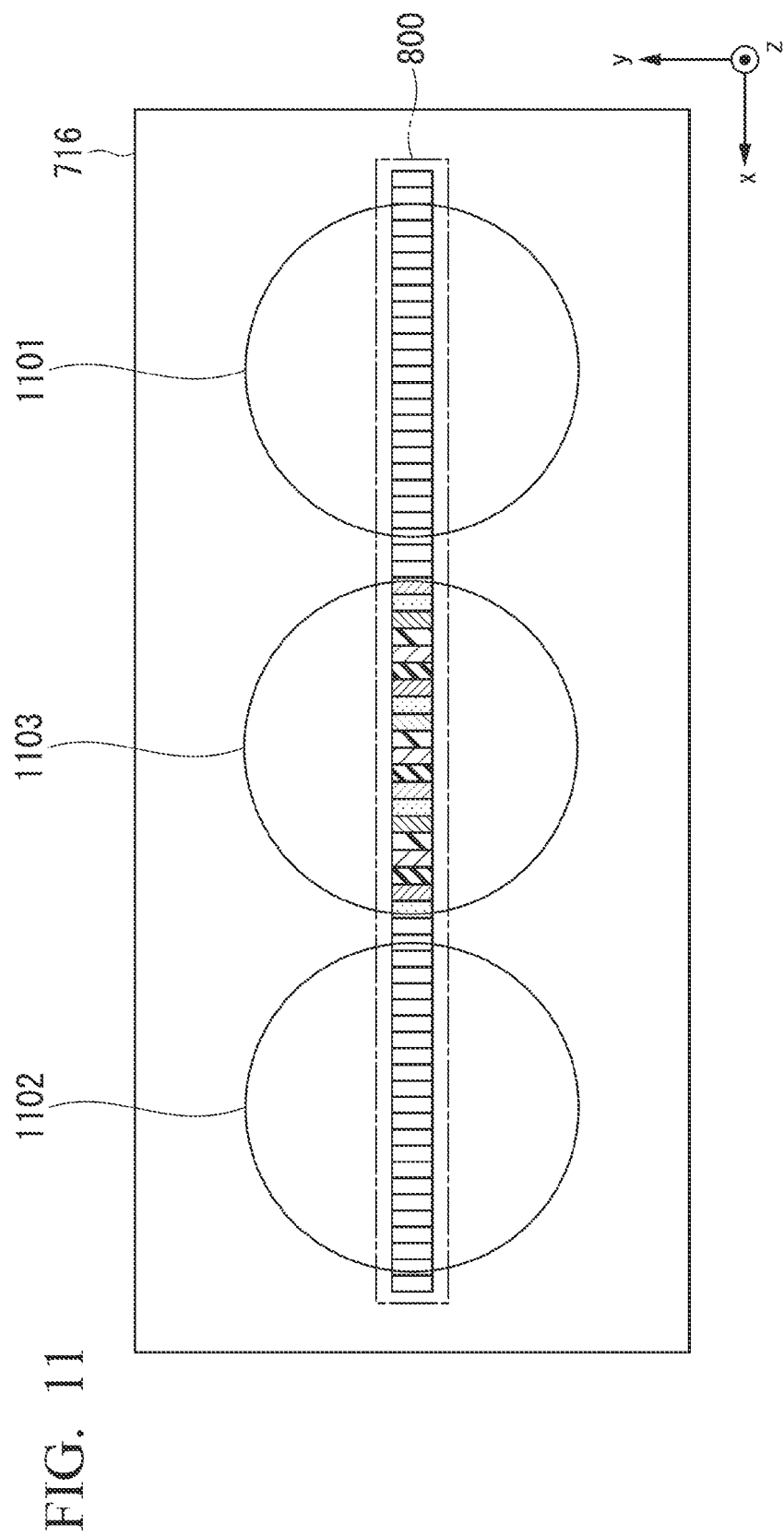
FIG. 11 is a schematic view illustrating an area where a projection image which is projected onto the light detector is displayed in accordance with the third preferred embodiment of the present invention.

Next, the structure of the light detector 716 will be described. FIG. 9 is a top surface view of the light detector 716 in accordance with the third preferred embodiment of the present invention. FIG. 10 is a cross-sectional view of the light detector 716 in accordance with the third preferred embodiment of the present invention. As is shown in these drawings, the light detector 716 includes a line sensor 800 which is formed by a plurality of the light receiving elements 201 arranged in a straight line. Color filters 202-1, 202-2, 202-3, . . . , 202-n (wherein n is an integer, in the third preferred embodiment n is set as 6) that each have a mutually different spectral transmittance are arranged in a repeating pattern on the respective light receiving surfaces of the light receiving elements 201 that are contained in an area of each light receiving element 201 where a projection image formed by the light guided on the optical path E shown in FIG. 11 is projected (described below). By employing this structure, of the respective light receiving elements 201 included in the line sensor 800, the light receiving elements 201 that are contained in an area 1103 where the projection image formed by the light guided on the optical path E shown in FIG. 11 is projected (described below) are able to detect spectrum information of mutually different wavelengths.

FIG. 11 is a schematic view illustrating a projection image created from light guided on the optical path C, a projection image created from light guided on the optical path D, and a projection image created from light guided on the optical path E that are each projected on the light detector 716 in accordance with the third preferred embodiment of the present invention. In the third preferred embodiment of the present invention, as is shown in the drawing, the projection image created from the light guided on the optical path C (i.e., the light that has passed through the second beam splitter 114) is projected onto the area 1101. Moreover, the projection image created from the light guided on the optical path D (i.e., the light that has been reflected by the second beam splitter 114 and reflected by the mirror 115) is projected onto the area 1102. Moreover, the projection image created from the light guided on the optical path E (i.e., the light that has been reflected by the third beam splitter 702, has passed through the color mixing unit 701, and has been irradiated onto the light detector 716) is projected onto the area 1103. Note that, as has been described above, when an image of the test specimen 101 is being formed on the imaging surface of the imaging element 109, the image point of the light guided on the optical path E is on the first plane which is the light detection surface of the light detector 116 (i.e., the first plane and the focus position 13 shown in FIG. 8). In the same way as in the first preferred embodiment of the present invention, the image point of the light guided on the optical path C is at the rear of the light detector 716 (i.e., the plane m and the rear focus position 11 shown in FIG. 8), and the image point of the light guided on the optical path D is at the front of the light detector 716 (i.e., the plane n and the front focus position 12 shown in FIG. 8).

Next, an operation of the microscope device 3 in accordance with the third preferred embodiment of the present invention will be described. Firstly, the stage control unit 104 causes the stage drive unit 103 to drive the stage 102 in a horizontal direction, so that a predetermined projection area of the test specimen 101 which is to be photographed is moved onto the optical axis of the objective lens 107. Next, the light source 105 generates light that is irradiated onto the test specimen 101. The light that is transmitted through the test specimen 101 is condensed by the objective lens 107, and is split between the direction of the first imaging lens 108 and the direction of the AF unit 712 by the first beam splitter 111.

The light that has been split in the direction of the first imaging lens 108 is irradiated via the first imaging lens 108, namely, is guided on the optical path A onto the imaging surface of the imaging element 109 included in the imaging unit 110. In contrast, the light that has been split in the direction of the AF unit 712 is guided on the optical path B and is irradiated onto the AF unit 712. The light irradiated onto the AF unit 712 is firstly transmitted through the second imaging lens 113 which forms part of the AF unit 712, and is then irradiated onto the second beam splitter 114. The light that is irradiated onto the second beam splitter 114 is split between the direction of the light detector 716 and the direction of the third beam splitter 702.

The light that has been split in the direction of the light detector 716 is guided on the optical path C and is projected onto the light detector 716. The projection image created by the light guided on the optical path C is projected onto the area 1101 shown in FIG. 11. In contrast, the light that has been split in the direction of the third beam splitter 702 is split by the third beam splitter 702 between the direction of the mirror 115 and the direction of the color mixing unit 701. The light that has been split in the direction of the mirror 115 is projected onto the light detector 716 via the mirror 115, namely, is guided on the optical path D. The projection image created by the light guided on the optical path D is projected onto the area 1102 shown in FIG. 11. In contrast, the light that has been split in the direction of the color mixing unit 701 is projected onto the light detector 716 via the color mixing unit 701, namely, is guided on the optical path E. The projection image created by the light guided on the optical path E is projected onto the area 1103 shown in FIG. 11 (eighth step and ninth step).

Next, the light detector 716 receives the light guided on the optical path C and irradiated onto the area 1101, and the light guided on the optical path D and irradiated onto the area 1102, and outputs a front focus signal and a rear focus signal. Note that in the third preferred embodiment of the present invention, the color filters 202-1 to 202-$n$ are not mounted on the light receiving elements 201 contained in the areas 1101 and 1102. Because of this, the light receiving elements 201 contained in the areas 1101 and 1102 are able to detect the intensity of light irradiated thereon with more sensitivity. The front focus signal and rear focus signal output by the light detector 716 are input into the contrast detection unit 117. The contrast detection unit 117 detects the difference in contrast between the front focus signal and rear focus signal, and creates a differential contrast signal which it then inputs into the stage control unit 104. The stage control unit 104 moves the position of the test specimen 101 (i.e., the position of the stage 102) in the Z-axial direction such that the value of the differential contrast signal input from the contrast detection unit 117 equals zero, and controls the focus of the imaging element 109 such that it is focused on the test specimen 101. When the value of the differential contrast signal input from the contrast detection unit 117 reaches zero, the stage control unit 104 determines that the imaging element 109 is in a focused state, and ends the focus processing.

After the focus processing has ended, the imaging unit 110 receives a command from a computer system (not shown) instructing it to photograph the test specimen 101, and then create image data for the test specimen 101. Thereafter, the imaging unit 110 inputs the created image data into the color tone correction unit 119.

Moreover, when the imaging unit 110 is photographing an image of the test specimen 101, namely, when the amount of light that is irradiated onto the area 1103 of the light detector 716 is at maximum, the light that is irradiated onto the area 1103 of the light detector 716 has been guided on the optical path E and has been color-mixed by the color mixing unit 701. Namely, the light resulting from the color-mixing of an image of a predetermined area of the test specimen 101 is irradiated onto the area 1103 of the light detector 716. Color filters 202-1, 202-2, 202-3, ..., 202-$n$ that have mutually different spectral transmittances are mounted on the respective light receiving elements 201 that are contained within the area 1103 of the line sensor 800 which is provided in the light detector 716. By employing this structure, the respective light receiving elements 201 that are contained within the area 1103 of the line sensor 800 photoelectrically convert light which corresponds to the spectrum of the color filters 202-1, 202-2, 202-3, ..., 202-$n$. Electrical signals that correspond to the intensity of the light of the respective spectrums and that have been photoelectrically converted by the respective light receiving elements 201 that are contained within the area 1103 of the line sensor 800 provided in the light detector 716 are input into the spectrum detection unit 118. The spectrum detection unit 118 performs signal processing on the input electrical signals, and creates spectrum information showing color information for the test specimen 101 which it then inputs into the color tone correction unit 119. The spectrum detection processing is then ended.

Next, based on the spectrum information created by the spectrum information detection unit 118, the color tone correction unit 119 corrects the image data created by the imaging unit 110 such that the color reproducibility thereof is accurate, and then creates an estimated spectral transmittance image which it then outputs.

As has been described above, in the third preferred embodiment of the present invention, because none of the color filters 201-1 to 202-$n$ are mounted on the light receiving elements 201 that detect the light that is used to perform focus processing, it is possible to detect the intensity of irradiated light with even greater sensitivity. As a result of this, the microscope device 3 is able to perform more accurate focus processing. Moreover, because the color mixing unit 701 is located on the optical path E, color-mixed light in which the colors have been more uniformly mixed is irradiated onto the light receiving elements 201 that detect the light which is used to perform spectrum detection processing. Furthermore, because the microscope device 3 performs spectrum detection when the color-mixed light is at its maximum, it is able to obtain more accurate spectrum information. Accordingly, the microscope device 3 in accordance with the third preferred embodiment of the present invention is able to acquire image data in which the focus has been adjusted more accurately. Moreover, the microscope device 3 is able to correct the image data created by the imaging unit 110 such that the color reproducibility thereof is more accurate.

Note that in the above description, an example is given in which the color filters 202-1, 202-2, 202-3, ..., 202-$n$ that each have a mutually different spectral transmittance are arranged in a repeating pattern on the light receiving surfaces of all of the light receiving elements 201 that are contained within an area where the projection image created by the light guided on the optical path E is projected (i.e., the area 1103), however, the present invention is not limited to this. For example, color filters 202-1, 202-2, 202-3, ..., 202-$n$ that each have a mutually different spectral transmittance may be arranged in a repeating pattern on the light receiving surfaces of only a portion of the light receiving elements 201 (for example, the light receiving elements 201 adjacent to the center of the area 1103) that are contained within the area 1103. Spectrum information may then be created based on the electrical signals that correspond to the intensity of the light of each spectrum and that have been photoelectrically converted by the light receiving elements 201 where the color filters 202-1, 202-2, 202-3, ..., 202-$n$ have been placed.

Fourth Preferred Embodiment

Figure 12:
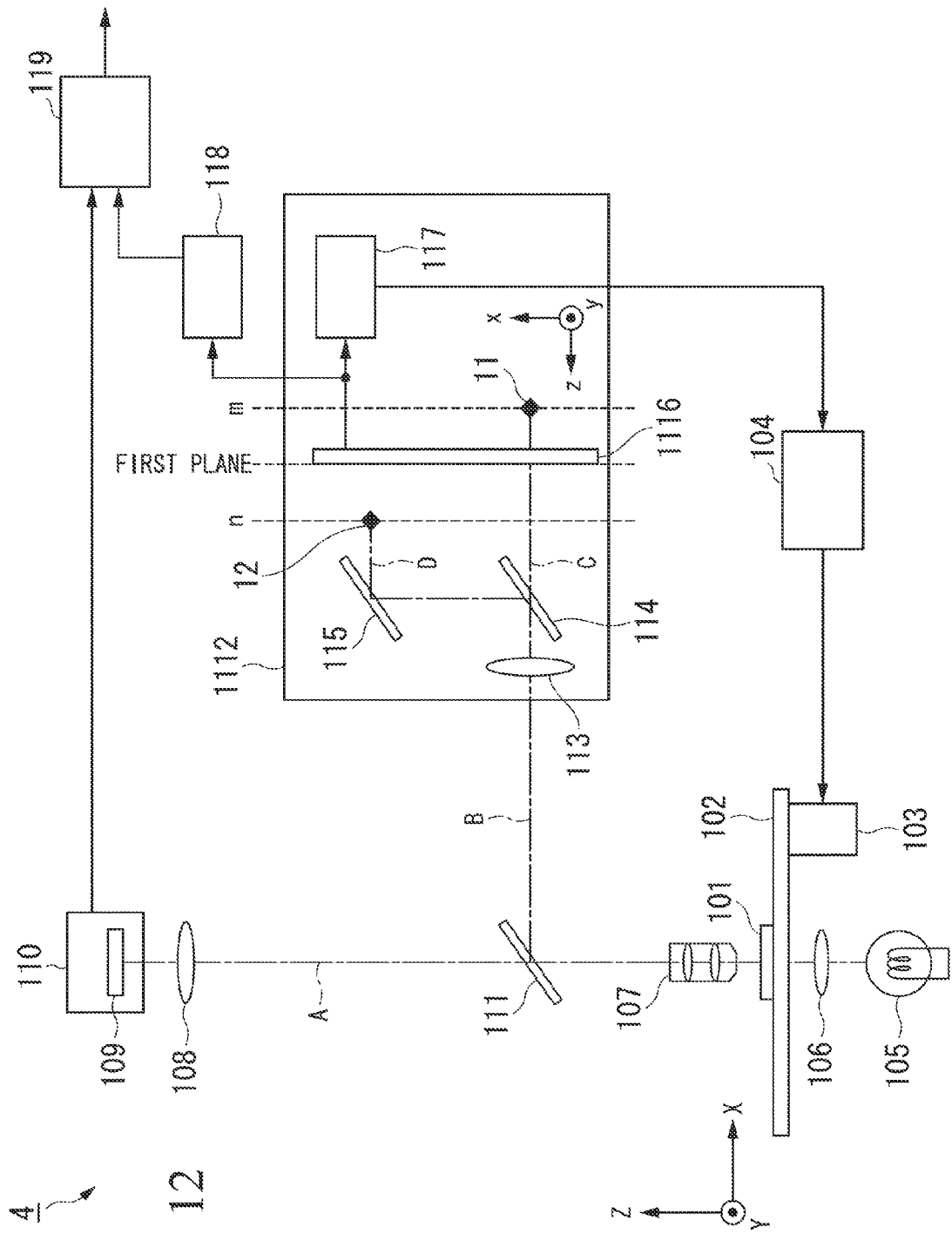
FIG. 12 is a schematic view illustrating a structure of a microscope device in accordance with a fourth preferred embodiment of the present invention.

A fourth preferred embodiment of the present invention will be described with reference made to the drawings. FIG. 12 is a schematic view illustrating a structure of a microscope device 4 in accordance with the fourth preferred embodiment of the present invention. The only difference between the structure of the microscope device 4 of the fourth preferred embodiment and the structure of the microscope device 1 of the first preferred embodiment is the structure of an AF unit 1112. Note that in FIG. 12, component elements that are the same as those shown in FIG. 1 are given the same descriptive symbols as in FIG. 1.

The AF unit 1112 includes the second objective lens 113, the second beam splitter 114, the mirror 115, the contrast detection unit 117, and a light detector 1116. The second objective lens 113, the second beam splitter 114, the mirror 115, and the contrast detection unit 117 are the same as their corresponding components in the first preferred embodiment. Note that in the fourth preferred embodiment, in the same way as in the first preferred embodiment, the imaging surface of the imaging element 109 which is included in the imaging unit 110 is placed in a position where the image of the test specimen 101 is formed when the value of the differential contrast signal output by the light detector 1116 equals zero.

Figure 13:
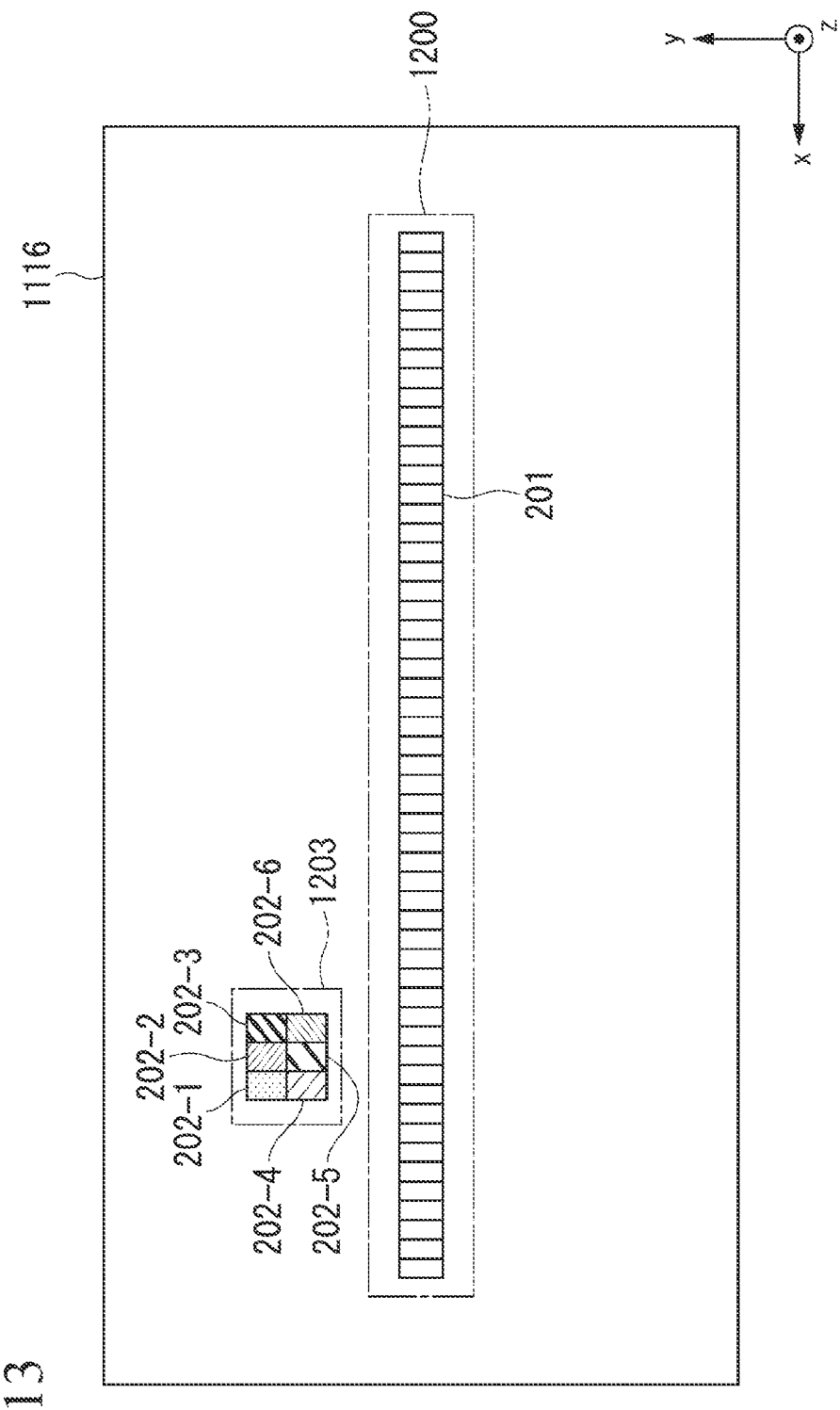
FIG. 13 is a top surface view of a light detector in accordance with the fourth preferred embodiment of the present invention.

Next, the structure of the light detector 1116 will be described. FIG. 13 is a top surface view of the light detector 1116 in accordance with the fourth preferred embodiment of the present invention. As is shown in this drawing, the light detector 1116 includes a line sensor 1200 (i.e., a first sensor) which is formed by a plurality of light receiving elements 201 arranged in a straight line, and with a color sensor 1203 (i.e., a second sensor). The color sensor 1203 includes n number (wherein n is an integer, in the fourth preferred embodiment n is set as 6) of light receiving elements 201, and color filters 202-1, 202-2, 202-3, ..., 202-n that each have a mutually different spectral transmittance are arranged on the light receiving surfaces of the light receiving elements 201. The color sensor 1203 is located in an area where the projection image formed by the light that has been guided on the optical path D is projected. By employing this structure, the light receiving elements 201 provided in the color sensor 1203 are able to detect spectrum information of mutually different wavelengths.

Figure 14:
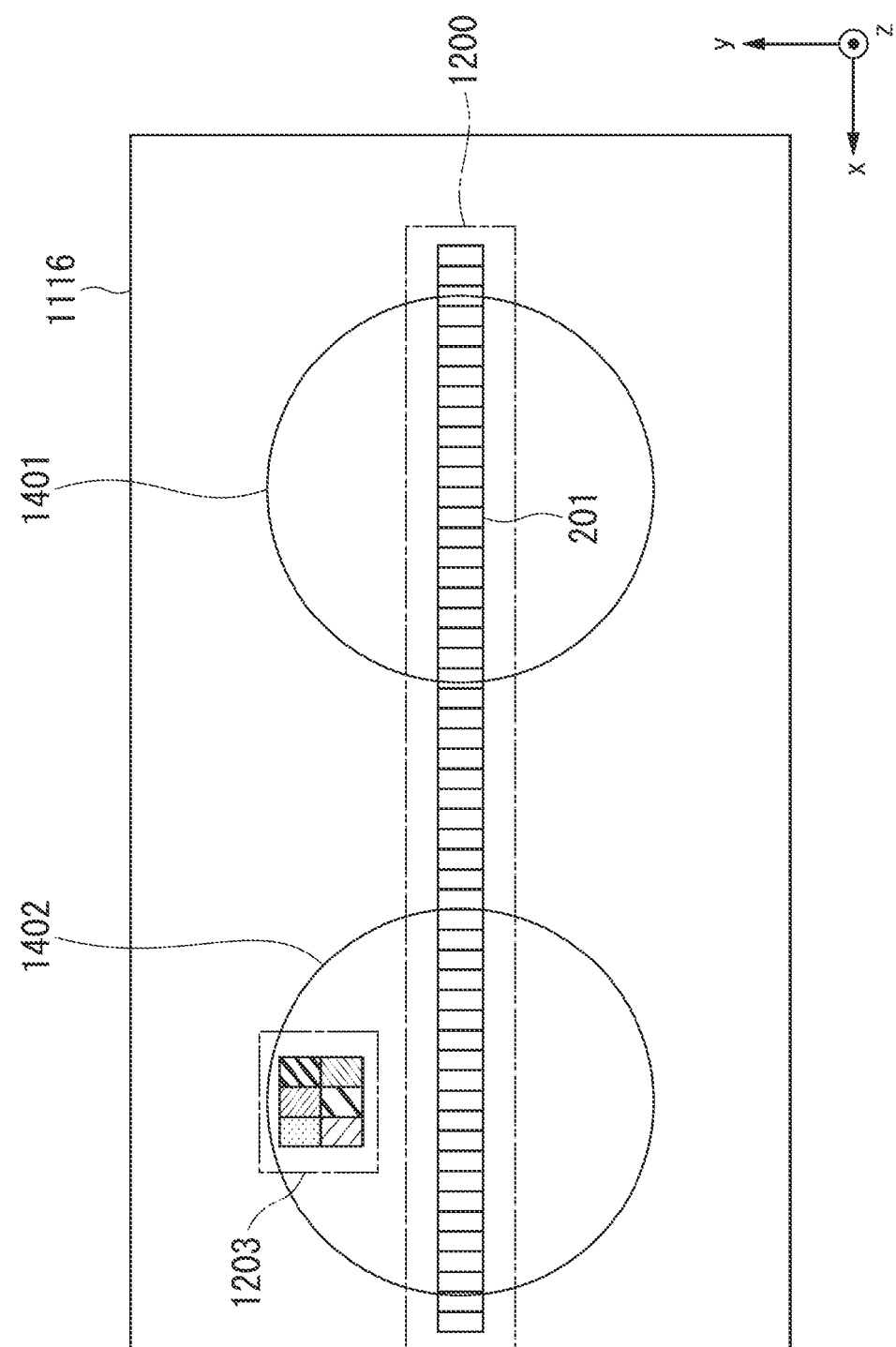
FIG. 14 is a schematic view illustrating an area where a projection image which is projected onto the light detector is displayed in accordance with the fourth preferred embodiment of the present invention.

FIG. 14 is a schematic view illustrating a projection image which is projected onto the light detector 1116 and is created by light guided on the optical path C, and a projection image which is projected onto the light detector 1116 and is created by light guided on the optical path D in accordance with the fourth preferred embodiment of the present invention. In the fourth preferred embodiment of the present invention, as is shown in the drawing, the projection image created by the light guided on the optical path C (i.e., the light which has been transmitted by the second beam splitter 114) is projected onto an area 1401. Moreover, the projection image created by the light guided on the optical path D (i.e., the light which has been reflected by the second beam splitter 114 and then reflected by the mirror 115) is projected onto an area 1402. Note that, in the same way as in the first preferred embodiment, the image point of the light guided on the optical path C is behind the light detector 1116 (in FIG. 12, this is a rear focus position 11 on the plane m), while the image point of the light guided on the optical path D is in front of the light detector 1116 (in FIG. 12, this is a front focus position 12 on the plane n).

Next, an operation of the microscope device 4 in accordance with the fourth preferred embodiment of the present invention will be described. The focus processing of the microscope device 4 of the fourth preferred embodiment is the same as the focus processing of the microscope device 1 of the first preferred embodiment. After the focus processing has ended, the imaging unit 110 receives a command from a computer system (not shown) instructing it to photograph the test specimen 101, and then create image data for the test specimen 101. Thereafter, the imaging unit 110 inputs the created image data into the color tone correction unit 119.

Moreover, when the imaging unit 110 is photographing an image of the test specimen 101, namely, when the differential contrast signal equals zero, unfocused light that is in a front focus state (i.e., light that is in a blurry, unfocused state) is irradiated onto the area 1203 of the light detector 1116. Namely, the light obtained when an image of a predetermined area of the test specimen 101 is color-mixed is irradiated onto the color sensor 1203 that is located in the area 1402 of the light detector 1116. Color filters 202-1, 202-2, 202-3, ..., 202-n that have mutually different spectral transmittances are mounted on the respective light receiving elements 201 of the color sensor 1203. By employing this structure, the respective light receiving elements 201 of the color sensor 1203 photo-electrically convert light which corresponds to the spectrum of the color filters 202-1, 202-2, 202-3, ..., 202-n. Electrical signals that correspond to the intensity of the light of the respective spectrums and that have been photoelectrically converted by the respective light receiving elements 201 of the color sensor 1203 provided in the light detector 1116 are input into the spectrum detection unit 118. The spectrum detection unit 118 performs signal processing on the input electrical signals, and creates spectrum information showing color information for the test specimen 101 which it then inputs into the color tone correction unit 119.

Next, based on the spectrum information created by the spectrum information detection unit 118, the color tone correction unit 119 corrects the image data created by the imaging unit 110 such that the color reproducibility thereof is accurate, and then creates an estimated spectral transmittance image which it then outputs.

As has been described above, according to the fourth preferred embodiment of the present invention, the microscope device 4 splits light from the test specimen 101 two-ways which it then sends respectively to the imaging unit 110 and the AF unit 1112. Of this light which has been split two-ways, the imaging unit 110 uses one light to acquire an image of the test specimen 101, and create image data. Meanwhile, the AF unit 1112 uses the other light from the test specimen which was split two-ways to create a differential contrast signal that is used to adjust the focus of the imaging element 109 of the imaging unit 110 to a focused state, and to create spectrum information that is used to accurately correct the color reproducibility of the image data created by the imaging unit 110. As a result, the light from the test specimen 101 is not split three-ways, as is the case conventionally, and it is possible to create image data, to create a differential contrast signal, and also to create spectrum information. Furthermore, in the fourth preferred embodiment of the present invention, because none of the color filters 201-1 to 202-n are mounted on the light receiving elements 201 that detect the light that is used to perform focus processing, it is possible to detect the intensity of irradiated light with even greater sensitivity. As a result of this, the microscope device 4 is able to perform more accurate focus processing. Accordingly, the microscope device 4 of the fourth preferred embodiment is able to acquire image data in which the focus has been adjusted more accurately. Moreover, the microscope device 4 is able to correct the image data created by the imaging unit 110 such that the color reproducibility thereof is more accurate.

Fifth Preferred Embodiment

Figure 15:
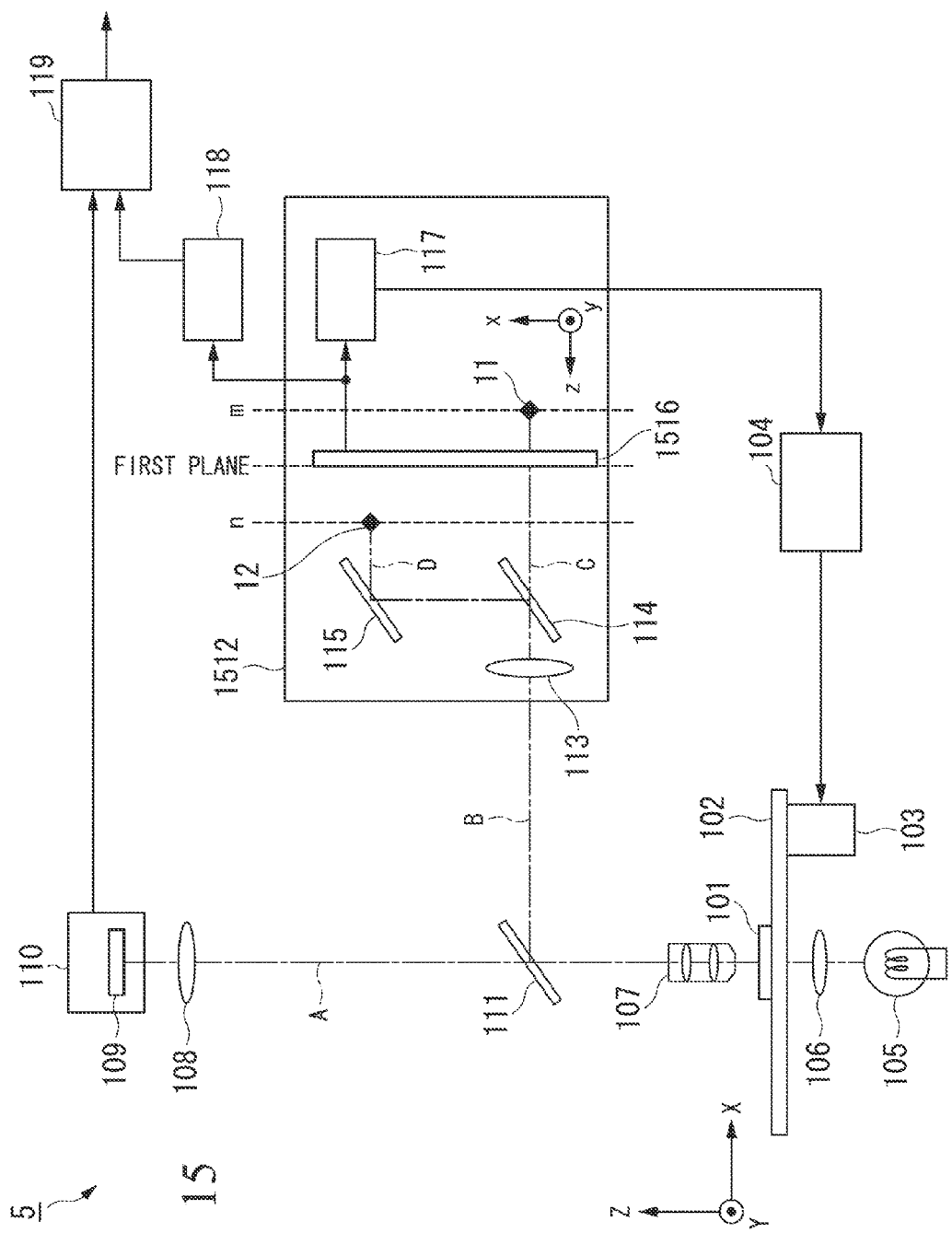
FIG. 15 is a schematic view illustrating a structure of a microscope device in accordance with a fifth preferred embodiment of the present invention.

A fifth preferred embodiment of the present invention will be described with reference made to the drawings. FIG. 15 is a schematic view illustrating a structure of a microscope device 5 in accordance with the fifth preferred embodiment of the present invention. The only difference between the structure of the microscope device 5 of the fifth preferred embodiment and the structure of the microscope device 4 of the fourth preferred embodiment is the structure of an AF unit 1512. Note that in FIG. 15, component elements that are the same as those shown in FIG. 12 are given the same descriptive symbols as in FIG. 12.

The AF unit 1512 includes the second objective lens 113, the second beam splitter 114, the mirror 115, the contrast detection unit 117, and a light detector 1516. The second objective lens 113, the second beam splitter 114, the mirror 115, and the contrast detection unit 117 are the same as their corresponding components in the fourth preferred embodiment. Note that in the fifth preferred embodiment, in the same way as in the fourth preferred embodiment, the imaging surface of the imaging element 109 which is included in the imaging unit 110 is placed in a position where the image of the test specimen 101 is formed when the value of the differential contrast signal output by the light detector 1516 equals zero.

Figure 16:
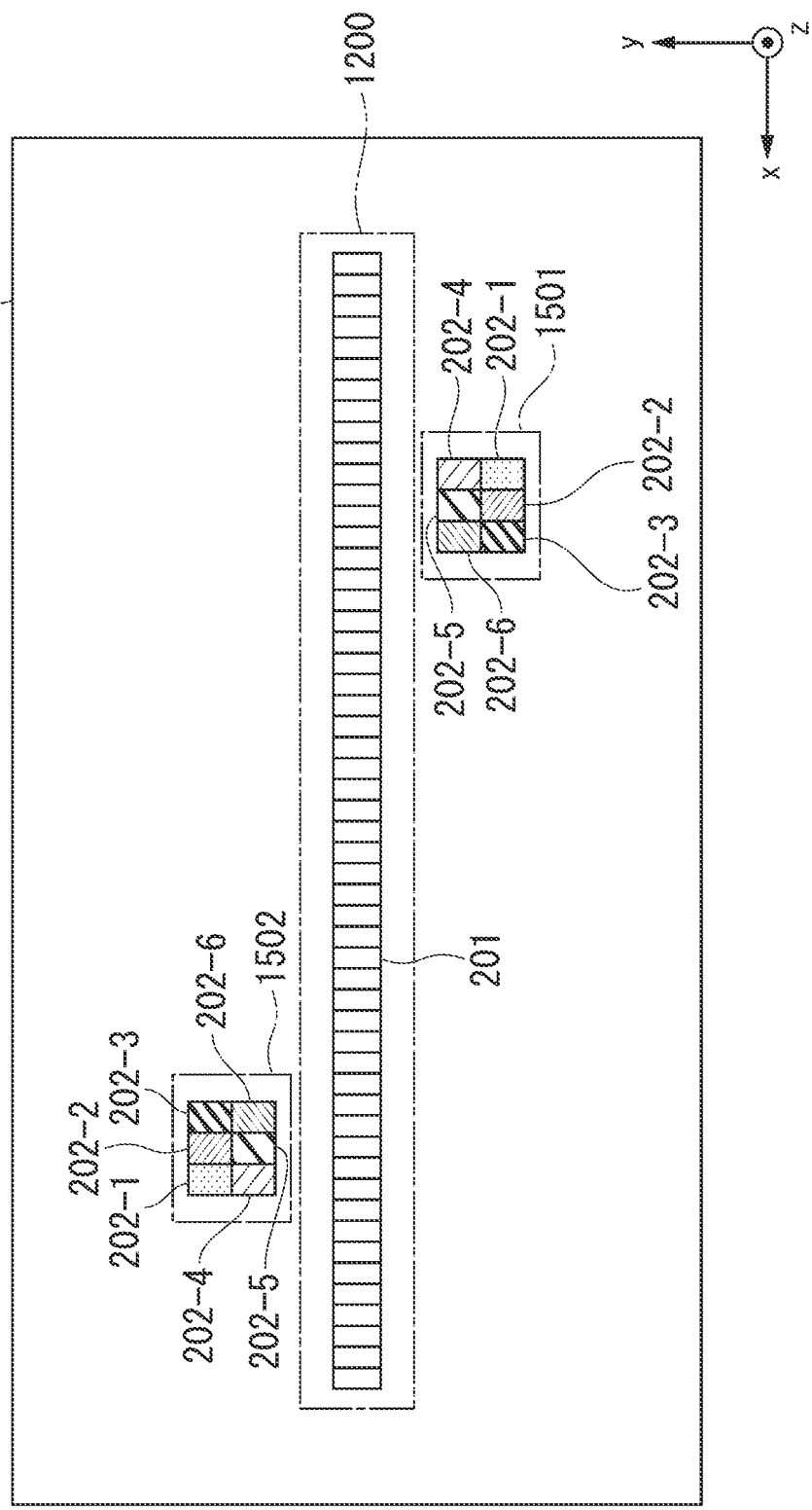
FIG. 16 is a top surface view of the light detector in accordance with the fifth preferred embodiment of the present invention.

Next, the structure of the light detector 1516 will be described. FIG. 16 is a top surface view of the light detector 1516 in accordance with the fifth preferred embodiment of the present invention. As is shown in this drawing, the light detector 1516 includes a line sensor 1200 which is formed by a plurality of light receiving elements 201 arranged in a straight line, and with color sensors 1501 and 1502. The color sensors 1501 and 1502 include n number (wherein n is an integer, in the fifth preferred embodiment n is set as 6) of light receiving elements 201, and color filters 202-1, 202-2, 202-3, ..., 202-n that each have a mutually different spectral transmittance are arranged on the light receiving surfaces of the light receiving elements 201. The color sensor 1501 is located in an area where the projection image formed by the light that has been guided on the optical path C is projected. The color sensor 1502 is located in a position where a projection image that is conjugate with the projection image detected by the color sensor 1501 appears within an area where the projection image formed by the light that has been guided on the optical path D is projected, so that each pixel of the color sensor 1502 matches the image detected by each pixel of the color sensor 1501. By employing this structure, the light receiving elements 201 provided in the color sensors 1501 and 1502 are able to detect spectrum information of mutually different wavelengths.

Figure 17:
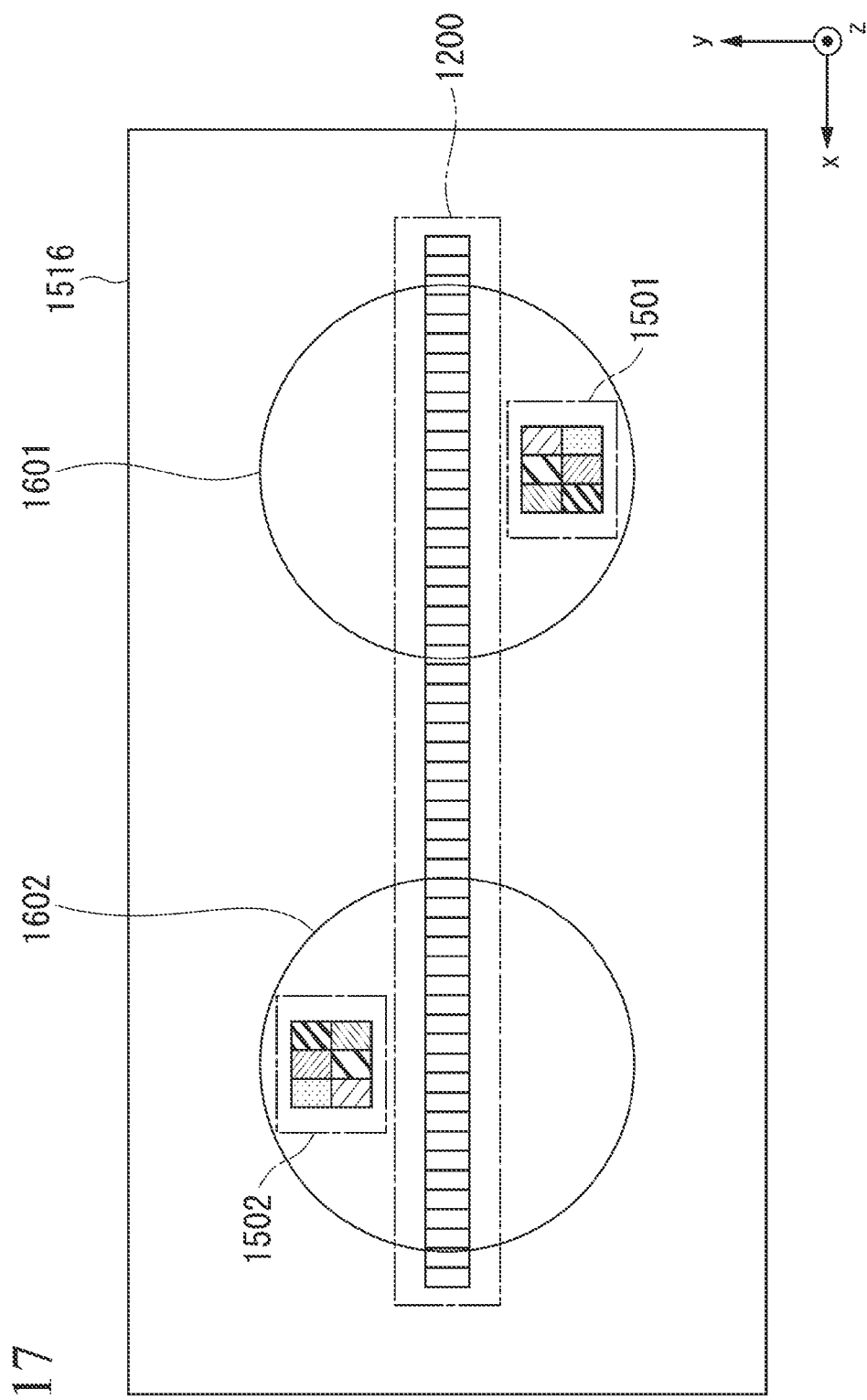
FIG. 17 is a schematic view illustrating an area where a projection image which is projected onto the light detector is displayed in accordance with the fifth preferred embodiment of the present invention.

FIG. 17 is a schematic view illustrating a projection image which is projected onto the light detector 1516 and is created by light guided on the optical path C, and a projection image which is projected onto the light detector 1516 and is created by light guided on the optical path D in accordance with the fifth preferred embodiment of the present invention. In the fifth preferred embodiment of the present invention, as is shown in the drawing, the projection image created by the light guided on the optical path C (i.e., the light which has been transmitted by the second beam splitter 114) is projected onto an area 1601. Moreover, the projection image created by the light guided on the optical path D (i.e., the light which has been reflected by the second beam splitter 114 and then reflected by the mirror 115) is projected onto an area 1602. Note that, in the same way as in the first preferred embodiment, the image point of the light guided on the optical path C is behind the light detector 1516 (in FIG. 15, this is a rear focus position 11 on the plane m), while the image point of the light guided on the optical path D is in front of the light detector 1516 (in FIG. 15, this is a front focus position 12 on the plane n).

Next, an operation of the microscope device 5 in accordance with the fifth preferred embodiment of the present invention will be described. The focus processing of the microscope device 5 of the fifth preferred embodiment is the same as the focus processing of the microscope device 4 of the fourth preferred embodiment. After the focus processing has ended, the imaging unit 110 receives a command from a computer system (not shown) instructing it to photograph the test specimen 101, and then create image data for the test specimen 101. Thereafter, the imaging unit 110 inputs the created image data into the color tone correction unit 119.

Moreover, when the imaging unit 110 is photographing an image of the test specimen 101, namely, when the differential contrast signal equals zero, unfocused light that is in a rear focus state (i.e., light that is in a blurry, unfocused state) is irradiated onto the area 1601 of the light detector 1516, while unfocused light that is in a front focus state is irradiated onto the area 1602 of the light detector 1516. Namely, the light obtained when an image of a predetermined area of the test specimen 101 is color-mixed is irradiated onto the color sensor 1501 that is located in the area 1601 of the light detector 1516, and onto the color sensor 1502 that is located in the area 1602 of the light detector 1516. Color filters 202-1 to 202-n that have mutually different spectral transmittances are mounted on the respective light receiving elements 201 of the color sensors 1501 and 1502. By employing this structure, the respective light receiving elements 201 of the color sensors 1501 and 1502 photoelectrically convert light which corresponds to the spectrum of the color filters 202-1, 202-2, 202-3, ..., 202-n. Electrical signals that correspond to the intensity of the light of the respective spectrums and that have been photoelectrically converted by the respective light receiving elements 201 of the color sensors 1501 and 1502 provided in the light detector 1516 are input into the spectrum detection unit 118. The spectrum detection unit 118 performs signal processing on the input electrical signals, and creates spectrum information showing color information for the test specimen 101 which it then inputs into the color tone correction unit 119.

Next, based on the spectrum information created by the spectrum information detection unit 118, the color tone correction unit 119 corrects the image data created by the imaging unit 110 such that the color reproducibility thereof is accurate, and then creates an estimated spectral transmittance image which it then outputs.

As has been described above, according to the fifth preferred embodiment of the present invention, because the light detector 1516, which is included in the microscope device 5, includes the two color sensors 1501 and 1502, it is possible to more accurately create the spectrum information that is used to accurately correct the color reproducibility of the image data created by the imaging unit 110. Accordingly, the microscope device 5 in accordance with the fifth preferred embodiment of the present invention is able to correct the image data created by the imaging unit 110 such that the color reproducibility thereof is more accurate.

Note that in the above described example, the color sensor 1502 is located in a position where a projection image that is conjugate with the projection image detected by the color sensor 1501 appears within an area where the projection image formed by the light that has been guided on the optical path D is projected, such that each pixel of the color sensor 1502 matches the image detected by each pixel of the color sensor 1501, however, it is not necessary for the color sensor 1502 to be placed in a position where a projection image that is conjugate with the projection image detected by the color sensor 1501 appears within an area where the projection image formed by the light that has been guided on the optical path D is projected.

Figure 18:
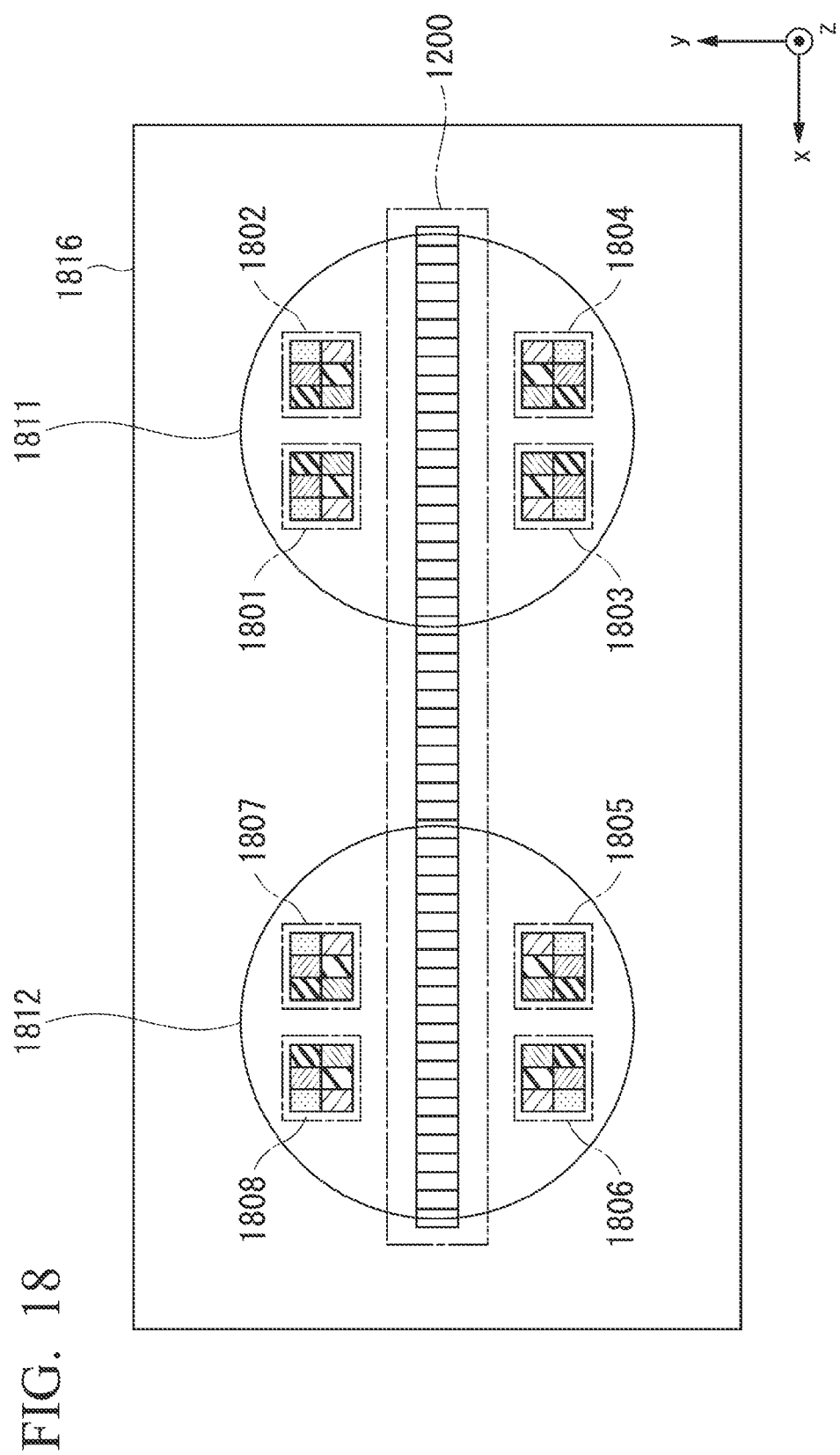
FIG. 18 is a top surface view of the light detector that includes eight color sensors in accordance with the fifth preferred embodiment of the present invention.

Note that the number of color sensors included in the light detector 1516 is not limited to two, and it is also possible for three or more to be included. FIG. 18 is a top surface view of a light detector that includes eight color sensors. As is shown in this drawing, a light detector 1816 includes a line sensor 1200, which is formed by a plurality of light receiving elements 201 arranged in a straight line, and color sensors 1801 to 1808. The structure of the color sensors 1801 to 1808 is the same as that of the color sensors 1501 and 1502 of the fifth preferred embodiment of the present invention. The color sensors 1801 to 1804 are located in an area 1811 where the projection image formed by the light that has been guided on the optical path C is projected. The color sensors 1805 to 1808 are located in an area 1812 where the projection image formed by the light that has been guided on the optical path D is projected. Note that the image point of the light guided on the optical path C is behind the light detector 1816, while the image point of the light guided on the optical path D is in front of the light detector 1816.

In this manner, by providing the light detector with a plurality of color sensors, and using output values from the plurality of color sensors to create the spectrum information, it is possible to more accurately create spectrum information that is used to accurately correct the color reproducibility of image data created by the imaging unit. Accordingly, a microscope device having a light detector that includes a plurality of color sensors is able to correct the image data created by an imaging unit such that the color reproducibility thereof is more accurate.

Sixth Preferred Embodiment

Figure 19:
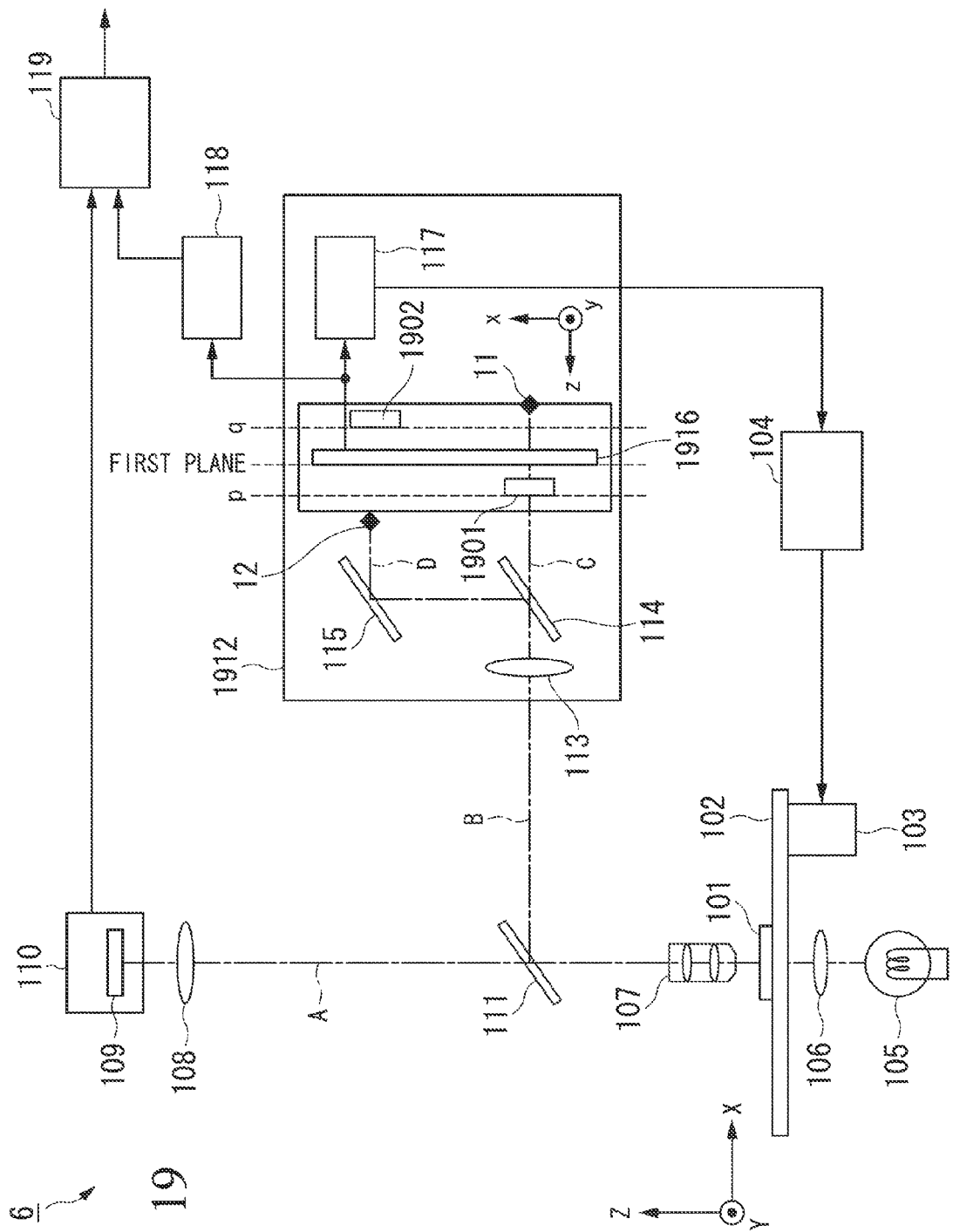
FIG. 19 is a schematic view illustrating a structure of a microscope device in accordance with a sixth preferred embodiment of the present invention.

A sixth preferred embodiment of the present invention will be described with reference made to the drawings. FIG. 19 is a schematic view illustrating a structure of a microscope device 6 in accordance with the sixth preferred embodiment of the present invention. The only difference between the structure of the microscope device 6 of the sixth preferred embodiment and the structure of the microscope device 5 of the fifth preferred embodiment is the structure of an AF unit 1912. Note that in FIG. 19, component elements that are the same as those shown in FIG. 12 are given the same descriptive symbols as in FIG. 15. The operating procedure of the microscope device 6 of the sixth preferred embodiment is the same as that of the microscope device 5 of the fifth preferred embodiment.

The AF unit 1912 includes the second objective lens 113, the second beam splitter 114, the mirror 115, the contrast detection unit 117, and a light detector 1916. The second objective lens 113, the second beam splitter 114, the mirror 115, and the contrast detection unit 117 are the same as their corresponding components in the fifth preferred embodiment. Note that in the sixth preferred embodiment, in the same way as in the fifth preferred embodiment, the imaging surface of the imaging element 109 which is included in the imaging unit 110 is placed in a position where the image of the test specimen 101 is formed when the value of the differential contrast signal output by the light detector 1916 equals zero.

The light detector 1916 includes a line sensor 1200 which is formed by a plurality of light receiving elements arranged in a straight line (see FIG. 20 described below), and with color sensors 1901 and 1902 that are provided on a different face from the light receiving face (i.e., a first plane) of the line sensor. The color sensor 1901 is placed in an area where a projection image that is formed by the light guided on the optical path C is projected, and is placed such that the sensor face of the color sensor 1901 is positioned on a plane p (i.e., a second plane) where the projection image formed by the light from the test specimen 101 is more out of focus than on the light receiving surface of the line sensor. The color sensor 1902 is placed in an area where a projection image that is formed by the light guided on the optical path D is projected, and is placed such that the sensor face of the color sensor 1902 is positioned on a plane q (i.e., a second plane) where the projection image formed by the light from the test specimen 101 is more out of focus than on the light receiving surface of the line sensor. Note that it is desirable for the distance from the light receiving face of the line sensor to the plane P to be the same as the distance from the light receiving face of the line sensor to the plane Q.

Figure 20:
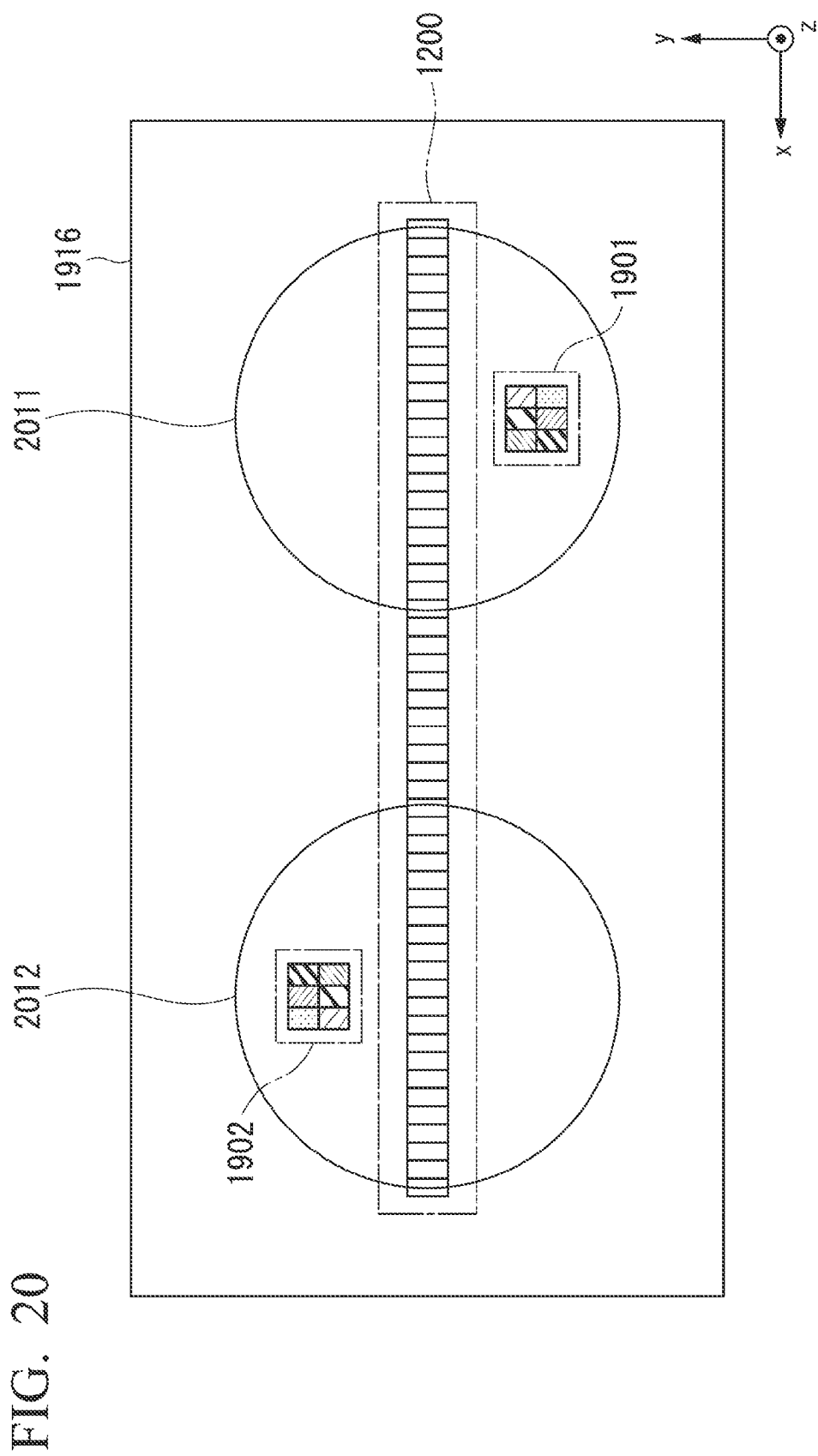
FIG. 20 is a top surface view of a light detector in accordance with the sixth preferred embodiment of the present invention.

Next, the structure of the light detector 1916 will be described. FIG. 20 is a top surface view of the light detector 1916 in accordance with the sixth preferred embodiment of the present invention. As is shown in this drawing, the light detector 1916 includes a line sensor 1200 which is formed by a plurality of light receiving elements 201 arranged in a straight line, and with color sensors 1901 and 1902. The color sensors 1901 and 1902 include n number (wherein n is an integer, in the sixth preferred embodiment n is set as 6) of light receiving elements 201, and color filters 202-1, 202-2, 202-3, ..., 202-n that each have a mutually different spectral transmittance are arranged on the light receiving surfaces of the light receiving elements 201. Moreover, as is described above, the color sensor 1901 is placed in an area 2011 where a projection image that is formed by the light guided on the optical path C is projected, and is placed on a plane (i.e., the plane p in FIG. 19) where the projection image formed by the light from the test specimen 101 is more out of focus than on the plane (i.e., the first plane) where the line sensor 1200 is placed. The color sensor 1902 is placed in an area 2012 where a projection image that is formed by the light guided on the optical path D is projected, and is placed on a plane (i.e., the plane q in FIG. 19) where the projection image formed by the light from the test specimen 101 is more out of focus than on the plane (i.e., the first plane) where the line sensor 1200 is placed.

By employing this structure, the respective light receiving elements 201 included in the color sensors 1901 and 1902 are able to detect spectrum information of mutually different wavelengths. Furthermore, the color sensors 1901 and 1902 are positioned on planes where projection images formed by light from the test specimen 101 are even more out of focus. Because of this, the light obtained when an image of a predetermined area of the test specimen 101 has undergone even more thorough color-mixing is irradiated onto the color sensors 1901 and 1902. Accordingly, the microscope device 6 of the sixth preferred embodiment is able to more accurately create the spectrum information that is used to accurately correct the color reproducibility of the image data created by the imaging unit 110, and is able to correct the image data created by the imaging unit 110 such that the color reproducibility thereof is more accurate.

Seventh Preferred Embodiment

Figure 21:
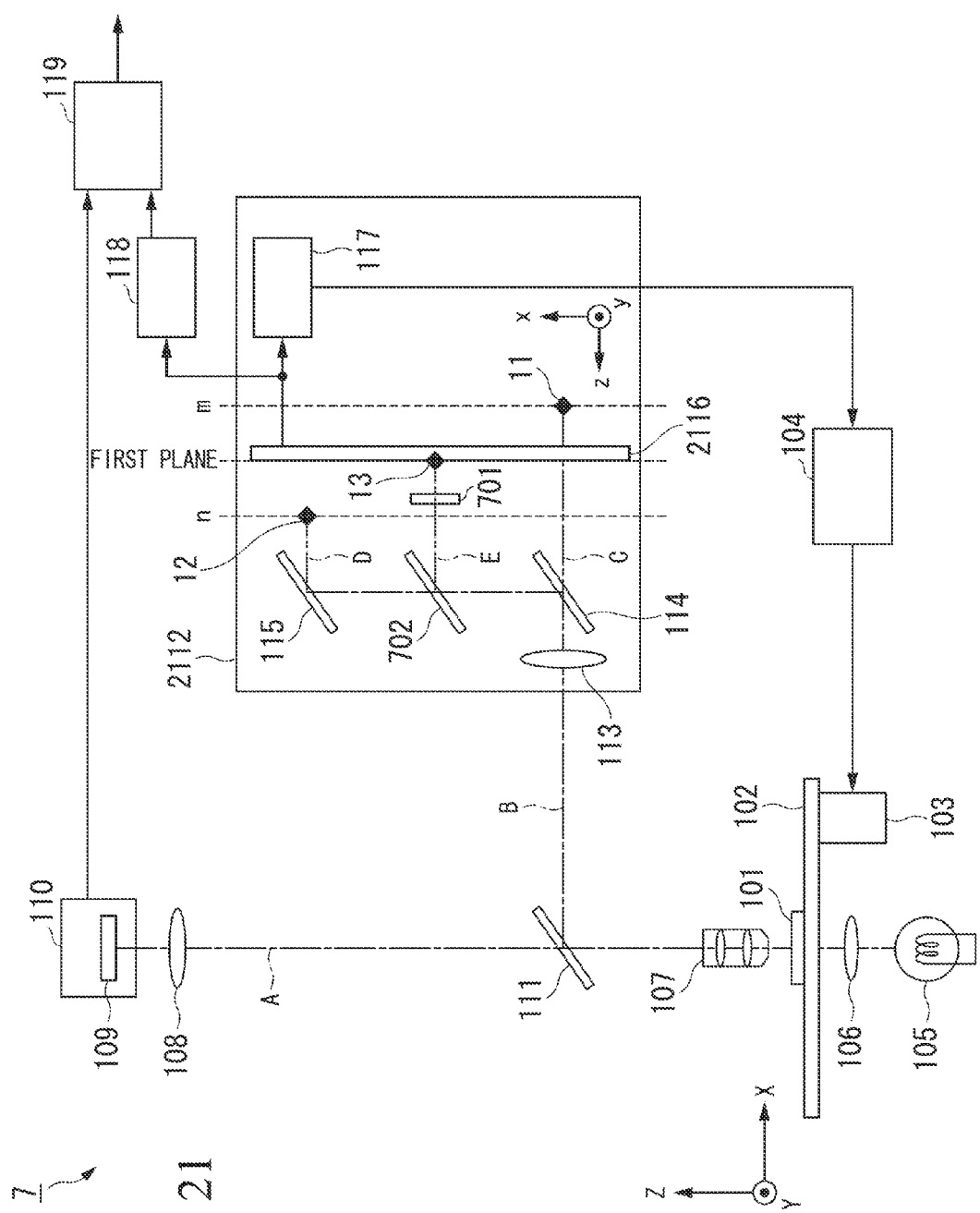
FIG. 21 is a schematic view illustrating a structure of a microscope device in accordance with a seventh preferred embodiment of the present invention.

A seventh preferred embodiment of the present invention will be described with reference made to the drawings. FIG. 21 is a schematic view illustrating a structure of a microscope device 7 in accordance with the seventh preferred embodiment of the present invention. The only difference between the structure of the microscope device 7 of the seventh preferred embodiment and the structure of the microscope device 3 of the third preferred embodiment is the structure of a light detector 2116 that is provided in an AF unit 2112. Note that in FIG. 21, component elements that are the same as those shown in FIG. 8 are given the same descriptive symbols as in FIG. 8. The operating procedure of the microscope device 7 of the seventh preferred embodiment is the same as that of the microscope device 3 of the third preferred embodiment.

Figure 22:
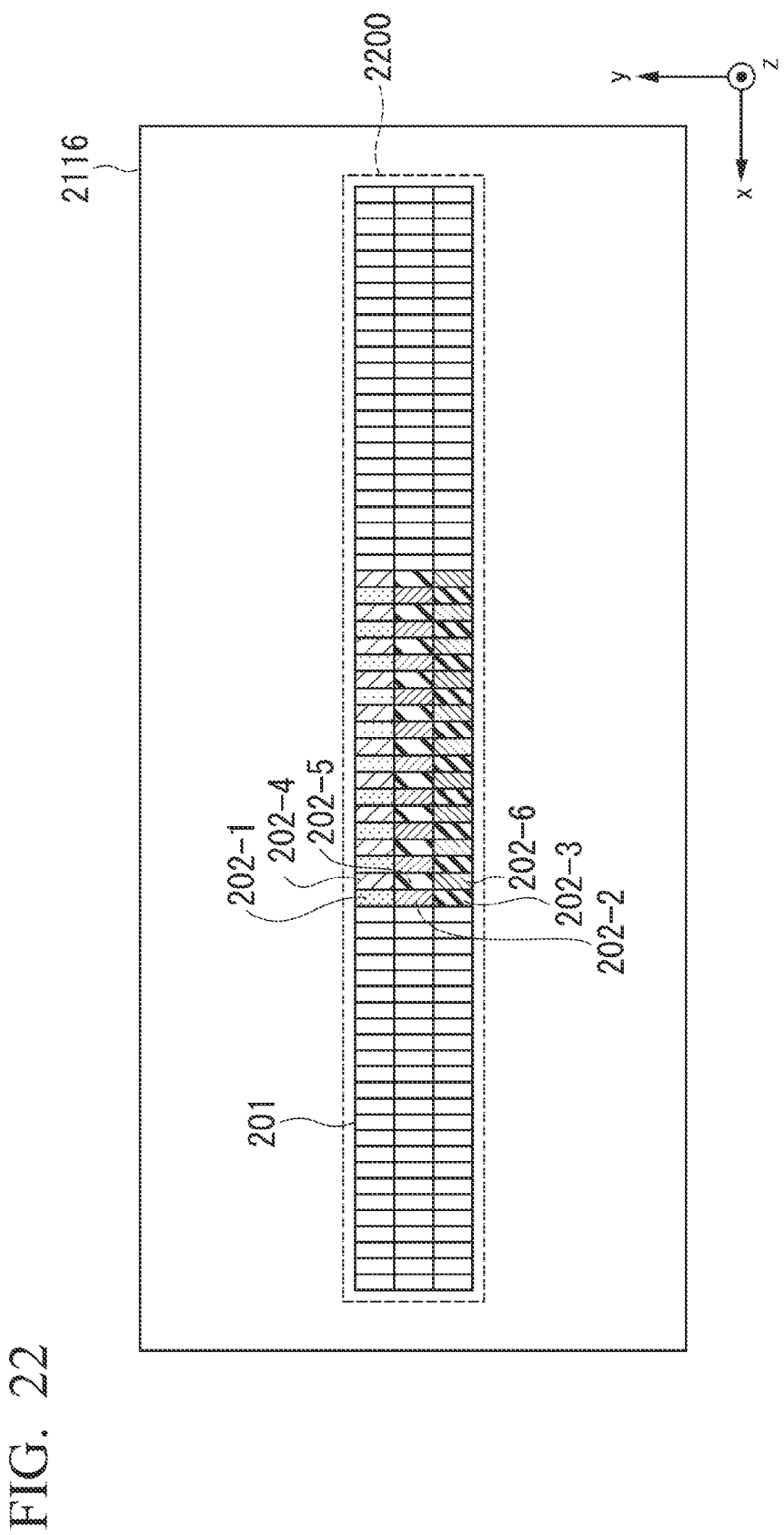
FIG. 22 is a top surface view of a light detector in accordance with the seventh preferred embodiment of the present invention.
Figure 23:
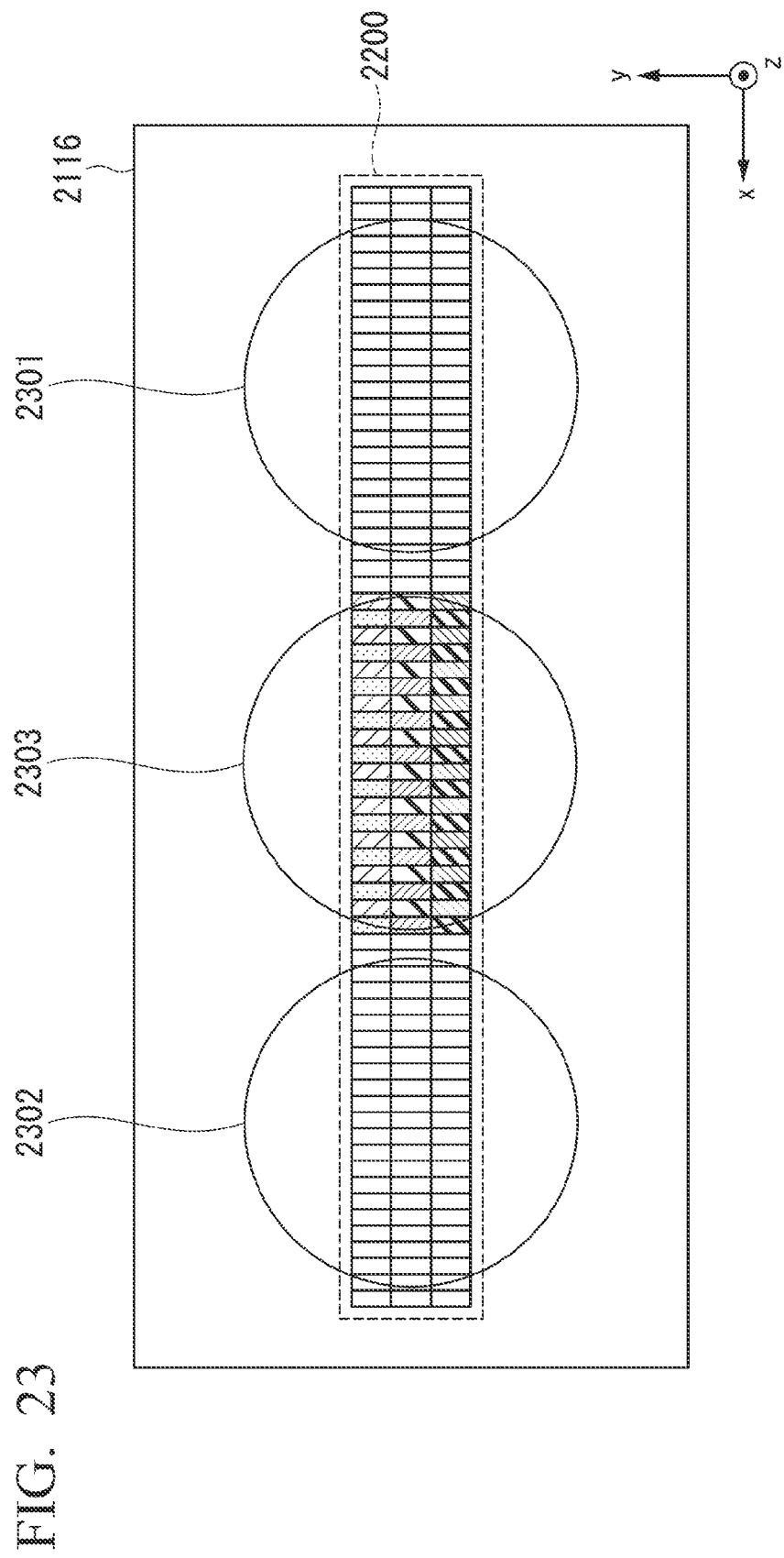
FIG. 23 is a schematic view illustrating an area where a projection image which is projected onto the light detector is displayed in accordance with the seventh preferred embodiment of the present invention.
Figure 24:
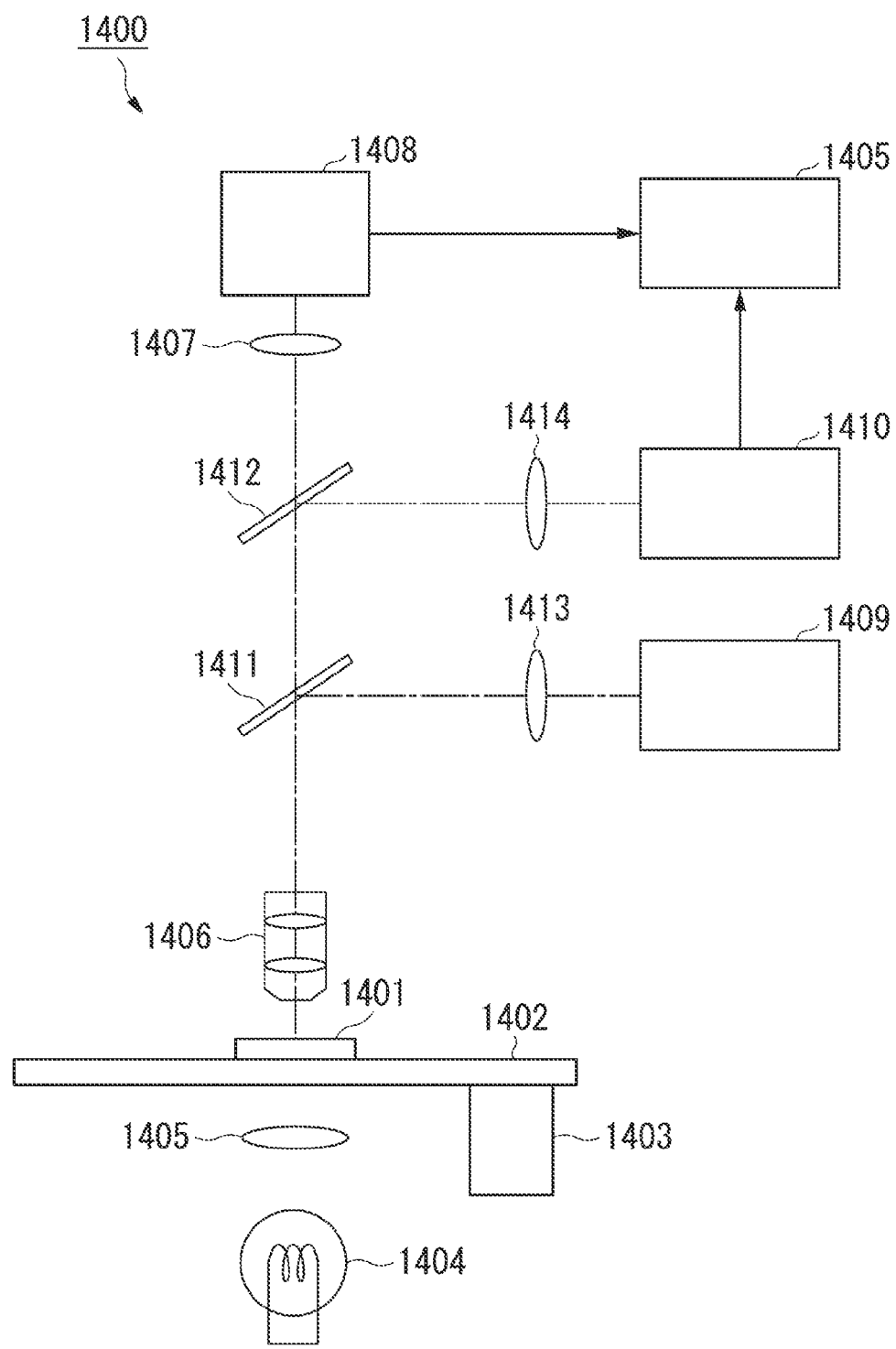
FIG. 24 is a block diagram illustrating a structure of a microscope device which has been fitted with a spectrum detector in accordance with the related art.

Next, the structure of the light detector 2116 will be described. FIG. 22 is a top surface view of the light detector 2116 in accordance with the seventh preferred embodiment of the present invention. As is shown in this drawing, the light detector 2116 includes an area sensor 2200 in which a plurality of the light receiving elements 201 are arranged in a two-dimensional pattern. Note that, instead of the area sensor 2200, the light detector 2116 may include a plurality of line sensors arranged in parallel. Color filters 202-1, 202-2, 202-3, . . . , 202-n (wherein n is an integer, in the seventh preferred embodiment n is set as 6) that each have a mutually different spectral transmittance are arranged in a repeating pattern on the respective light receiving surfaces of the light receiving elements 201 that are contained in an area of each light receiving element 201 where a projection image formed by the light guided on the optical path E shown in FIG. 23 is projected. By employing this structure, of the respective light receiving elements 201 included in the area sensor 2200, the light receiving elements 201 that are contained in an area where the projection image formed by the light guided on the optical path E shown in FIG. 23 is projected (described below) are able to detect spectrum information of mutually different wavelengths. Note that instead of arranging the color filters 202-1, 202-2, 202-3, . . . , 202-n on all of the light receiving elements 201 that are contained within the area where the projection image created by the light guided on the optical path E is projected, it is also possible, for example, to arrange light receiving elements 201 in which the color filters 202-1, 202-2, 202-3, . . . , 202-n are included in a checkered pattern with light receiving elements 201 in which these color filters are not provided.

FIG. 23 is a schematic view illustrating, in the seventh preferred embodiment of the present invention, a projection image which is projected onto the light detector 2116 and is formed by light guided on the optical path C, and a projection image which is projected onto the light detector 2116 and is formed by light guided on the optical path D, and a projection image which is projected onto the light detector 2116 and is formed by light guided on the optical path E. In the seventh preferred embodiment of the present invention, as is shown in the drawing, the projection image created by the light guided on the optical path C (i.e., the light which has been transmitted by the second beam splitter 114) is projected onto an area 2301. Moreover, the projection image created by the light guided on the optical path D (i.e., the light which has been reflected by the second beam splitter 114 and then reflected by the mirror 115) is projected onto an area 2302. Moreover, the projection image created by the light guided on the optical path E (i.e., the light which has been reflected by the third beam splitter 702 and then been transmitted by the color mixing unit 701) is projected onto an area 2303.

In this manner, by providing the area sensor 2200 in which the light receiving elements 201 are arranged two-dimensionally, and by using output values from the area sensor 2200 to create differential contrast signals and spectrum information, it is possible for the light detector 2116 to create the respective signals even more accurately. Accordingly, the microscope device 7 having the light detector 2116 that includes the area sensor 2200 in which the light receiving elements 201 are arranged two-dimensionally is able to more accurately adjust the focus of the imaging element 109 to a focused state, and to also correct the image data created by the imaging unit such that the color reproducibility thereof is more accurate.

The first preferred embodiment through the seventh preferred embodiment of this invention have been described above in detail with reference made to the drawings, however, the specific structure thereof is not limited to these embodiments and various designs and the like are included insofar as they do not depart from the scope of the present invention.

For example, examples have been described in which the microscope devices use spectrum information acquired by a spectrum detection unit to perform color correction of image data acquired by a line sensor, however, the present invention is not limited to this and it is also possible for the microscope devices to perform various types of correction provided that the correction method employed is able to make such corrections using spectrum information.

Accordingly, the invention is not to be considered as being limited by the foregoing description, and is only limited by the scope of the claims.

What is claimed is:

1. An imaging method comprising:
   a first step in which light from a test specimen is guided to an imaging unit along a first optical path;
   a second step in which light from the test specimen is guided to an auto focus unit along a second optical path;
   a third step in which the light guided to the auto focus unit is split, and is guided on a third optical path and a fourth optical path whose image point is different from that of the third optical path;
   a fourth step in which, based on a difference in contrast between the light that is guided on the third optical path and is projected onto a first plane and the light that is guided on the fourth optical path and is projected onto the first plane, a focal point of the imaging unit is adjusted such that an image of the test specimen that is created by the light from the test specimen guided on the first optical path is formed on an imaging surface of the imaging unit;
   a fifth step in which, using the light guided to the imaging unit, an image of the test specimen is acquired and image data is created;
   a sixth step in which, using the light guided to the autofocus unit, spectrum information for the test specimen is detected;
   a seventh step in which, based on the spectrum information that has been detected, a color tone of the image data is corrected;
   an eighth step in which a portion of the light guided on the fourth optical path is guided on a fifth optical path so as to form an image on the first plane; and
   a ninth step in which the light guided on the fifth optical path is color-mixed, and wherein,
   in the sixth step, the spectrum information for the test specimen is detected using the light that was color-mixed in the ninth step.

2. The imaging method according to claim 1, wherein, in the sixth step, the spectrum information for the test specimen is detected using at least one of the light guided on the third optical path and the light guided on the fourth optical path.

3. The imaging method according to claim 2, wherein, in the sixth step, the light guided on the third optical path and the light guided on the fourth optical path pass through a color mixing unit.

4. The imaging method according to anyone of claims 1 to 3, wherein,
   in the fourth step, a sensor that is located on the first plane detects a difference in contrast between the light that is guided on the third optical path and is projected onto the first plane and the light that is guided on the fourth optical path and is projected onto the first plane, and,
   in the sixth step, the sensor detects spectrum information for the test specimen.

5. The imaging method according to anyone of claims 1 to 3, wherein,
   in the fourth step, a first sensor that is located on the first plane detects a difference in contrast between the light that is guided on the third optical path and is projected onto the first plane and the light that is guided on the fourth optical path and is projected onto the first plane, and, in the sixth step, a second sensor that is located on the first plane detects spectrum information for the test specimen.

6. The imaging method according to anyone of claims 1 to 3, wherein, in the fourth step, a first sensor that is located on the first plane detects a difference in contrast between the light that is guided on the third optical path and is projected onto the first plane and the light that is guided on the fourth optical path and is projected onto the first plane, and, in the sixth step, a second sensor that is located on a second plane which is offset in a direction in which the focal point of the light guided on the third optical path or the fourth optical path is more unfocussed than it is on the first plane detects spectrum information for the test specimen.

7. A microscope device comprising:

an imaging unit that receives light from a test specimen, and creates image data by photographing an image of the test specimen;

a first beam splitter that splits light from the test specimen between a first optical path that guides the light to the imaging unit and a second optical path that guides the light to an autofocus unit;

a second beam splitter that splits the light guided to the autofocus unit between a third optical path and a fourth optical path whose image point is different from that of the third optical path;

a light detector that receives the light guided on the third optical path and the light guided on the fourth optical path, the light detector detecting a difference in contrast between the light guided on the third optical path and the light guided on the fourth optical path, the light detector detecting spectrum information for the test specimen using the light guided to the autofocus unit;

a focal point adjustment unit that, based on the difference in contrast detected by the light detector, adjusts the focal point of the imaging unit such that an image of the test specimen that is created by the light from the test specimen that is guided on the first optical path is formed on the imaging surface of the imaging unit;

a color tone correction unit that, based on the spectrum information detected by the light detector, corrects the color tone of the image data created by the imaging unit;

wherein a portion of the light guided on the fourth optical path is guided on a fifth optical path so as to form an image on the first plane, wherein the light guided on the fifth optical path is color-mixed, and further wherein, the spectrum information for the test specimen is detected using the light that was color-mixed.

* * * * *